(12) United States Patent
Fujiwara

(10) Patent No.: US 7,693,525 B2
(45) Date of Patent: Apr. 6, 2010

(54) RADIO FREQUENCY ASSIGNING APPARATUS, WIRELESS COMMUNICATION SYSTEM, AND RADIO FREQUENCY ASSIGNING METHOD

(75) Inventor: Atsushi Fujiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 511 days.

(21) Appl. No.: 11/628,986

(22) PCT Filed: Jun. 9, 2005

(86) PCT No.: PCT/JP2005/010574
§ 371 (c)(1), (2), (4) Date: Dec. 8, 2006

(87) PCT Pub. No.: WO2005/122484
PCT Pub. Date: Dec. 22, 2005

(65) Prior Publication Data
US 2007/0242650 A1    Oct. 18, 2007

(30) Foreign Application Priority Data
Jun. 9, 2004    (JP)    ............................. 2004-171821
Aug. 18, 2004    (JP)    ............................. 2004-238574

(51) Int. Cl.
*H04W 40/00*    (2009.01)
(52) U.S. Cl. ................ 455/447; 370/338; 370/341; 455/450
(58) Field of Classification Search ........... 370/338, 370/341; 455/447–454, 41.2, 41.3
See application file for complete search history.

(56) References Cited

U.S. PATENT DOCUMENTS 7,106,707 B1 *    9/2006    Strutt .................... 370/329

(Continued)

OTHER PUBLICATIONS

Chen Zong-Ming, et al., "MAC Protocols in Wireless Ad Hoc Networks : Study and Prospect", Nanjing University of Posts and Communications, Telecommunications Technology, Nanjing 210003, China, vol. 6, 2003, pp. 7-12 (with English Abstract).

(Continued)

*Primary Examiner*—Lun-Yi Lao
*Assistant Examiner*—Michael Nguyen
(74) *Attorney, Agent, or Firm*—Oblon, Spivak, McClelland, Maier & Neustadt, L.L.P.

(57) ABSTRACT

A radio channel allocation apparatus of a node in a radio communication system which controls to allocate a radio channel between nodes by a virtual carrier sense is disclosed. The radio channel allocation apparatus includes a node information collecting unit which collects information of a neighboring node to which the node can directly transmit data, and a radio channel determining unit that determines a radio channel, which is allocated to a communication link between a node which has transmission inhibition conditions and another node which does not have the transmission inhibition conditions by communications between predetermined nodes. The determined radio channel is a different radio channel from a radio channel between the predetermined nodes, based on node information of the node and the neighboring node.

6 Claims, 22 Drawing Sheets

U.S. PATENT DOCUMENTS

| | | | |
|---|---|---|---|
| 7,184,413 B2* | 2/2007 | Beyer et al. | 370/254 |
| 7,397,785 B2* | 7/2008 | Wu et al. | 370/350 |
| 2003/0210680 A1* | 11/2003 | Rao et al. | 370/352 |
| 2004/0147223 A1* | 7/2004 | Cho | 455/41.2 |
| 2004/0246903 A1* | 12/2004 | Huang et al. | 370/247 |
| 2004/0253924 A1* | 12/2004 | Acampora | 455/41.2 |
| 2005/0026611 A1* | 2/2005 | Backes | 455/434 |
| 2007/0060179 A1* | 3/2007 | Yamauchi et al. | 455/509 |

OTHER PUBLICATIONS

Akihiko Hosono, et al., "A Proposal for Solution of Unfairness Problem in IEEE 802.11 DCF Mobile Ad-Hoc Network", Nara Institute of Science and Technology, B-5-181, p. 558, 2003.

Katsunori Yatabe, et al., "Performance Improvement of IEEE 802.11 DCF in Multihop Wireless Ad Hoc Networks", Dept. of Information and Computer Sciences, B-5-180, p. 557, 2003.

* cited by examiner

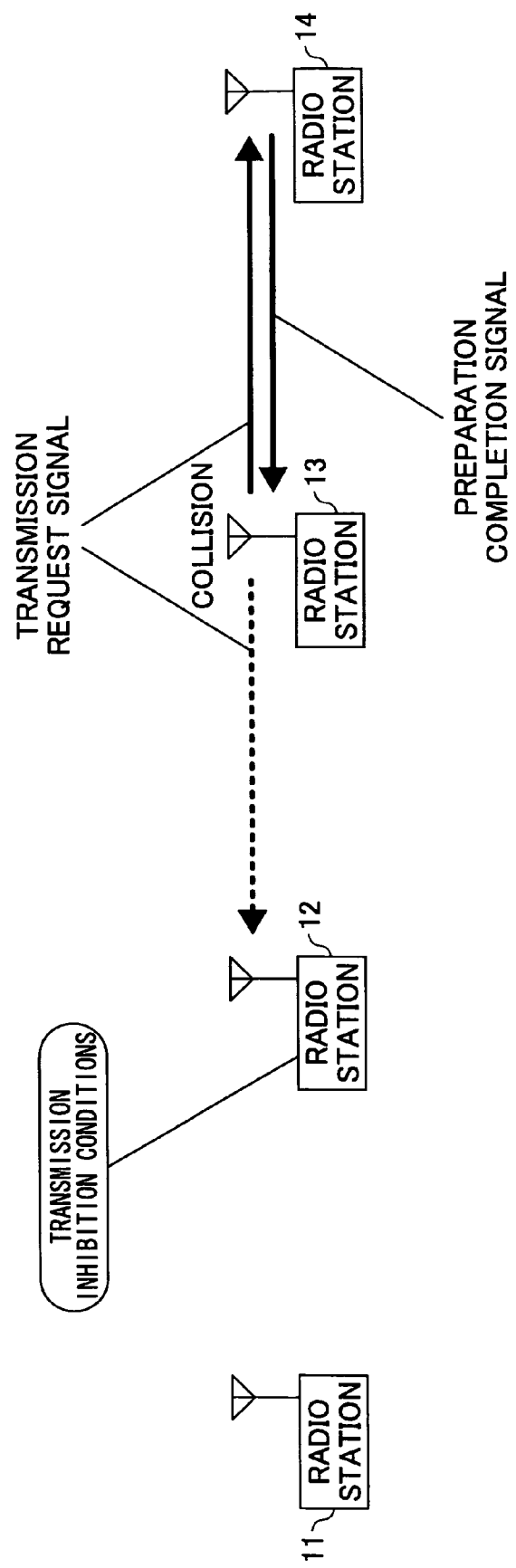

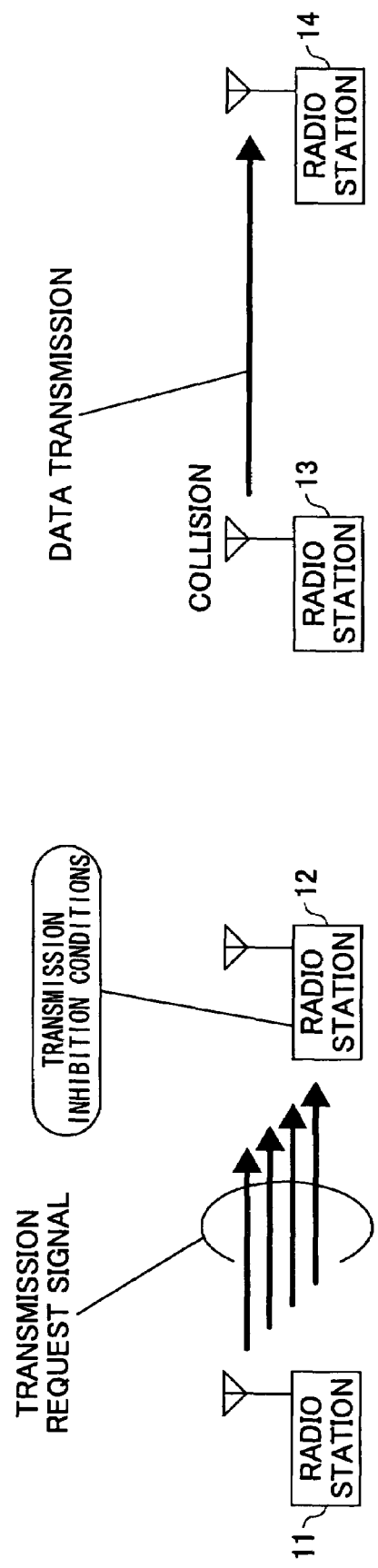

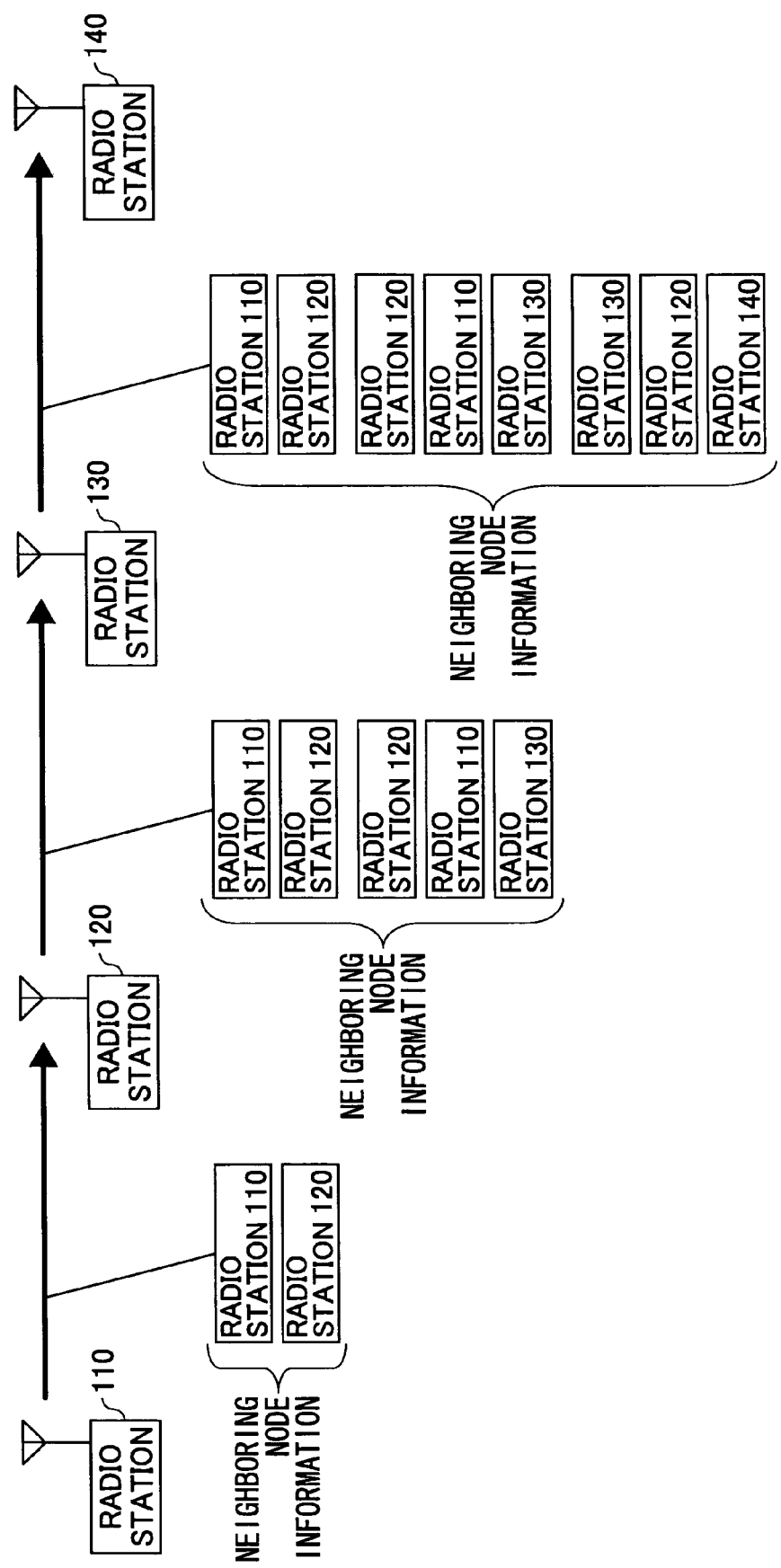

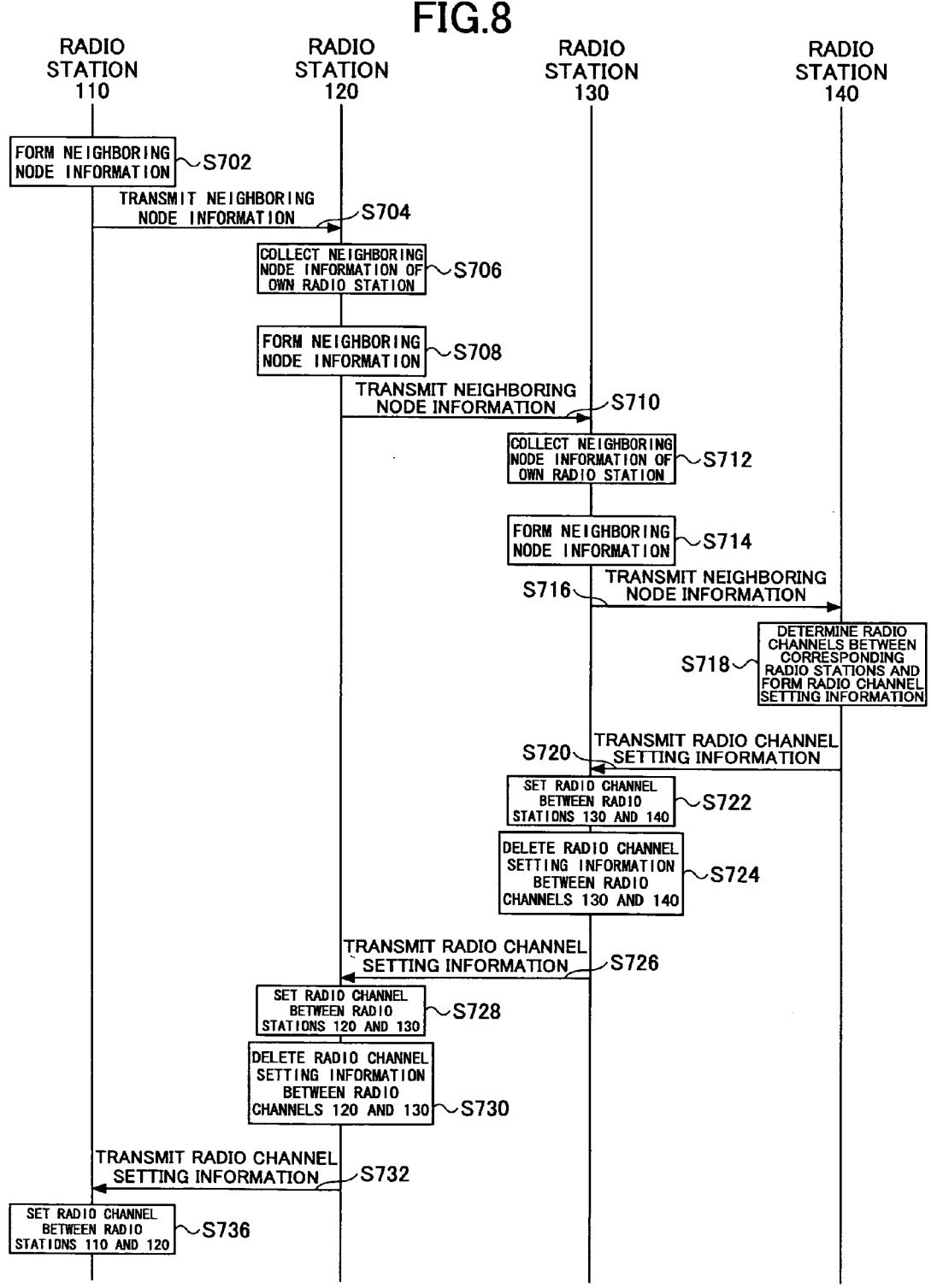

— Communication link
------- Carrier sensing link

FIG.16A

| COMBINATION OF COMMUNICATION LINKS | CONNECTION RELATIONSHIP | COMMON COMMUNICATION LINK | SCORE |
|---|---|---|---|
| C1,2 — C1,3 | NON-CONNECTION | C4,6, C5,6 | 2 |
| C1,2 — C1,5 | NON-CONNECTION | C4,6 | 1 |
| C1,2 — C2,3 | NON-CONNECTION | C4,6, C5,6 | 2 |
| C1,2 — C2,4 | NON-CONNECTION | C5,6 | 1 |
| C1,2 — C3,4 | NON-CONNECTION | NON-PRESENCE | 0 |
| C1,2 — C3,5 | NON-CONNECTION | NON-PRESENCE | 0 |
| C1,2 — C4,6 | CONNECTION | | − |
| C1,2 — C5,6 | CONNECTION | | − |
| C1,3 — C1,5 | NON-CONNECTION | C4,6 | 1 |
| C1,3 — C2,3 | NON-CONNECTION | C4,6, C5,6 | 2 |
| C1,3 — C2,4 | NON-CONNECTION | C5,6 | 1 |
| C1,3 — C3,4 | NON-CONNECTION | NON-PRESENCE | 0 |
| C1,3 — C3,5 | NON-CONNECTION | NON-PRESENCE | 0 |
| C1,3 — C4,6 | CONNECTION | | − |
| C1,3 — C5,6 | CONNECTION | | − |
| C1,5 — C2,3 | NON-CONNECTION | C4,6 | 1 |
| C1,5 — C2,4 | CONNECTION | | − |
| C1,5 — C3,4 | CONNECTION | | − |
| C1,5 — C3,5 | NON-CONNECTION | C2,4 | 1 |
| C1,5 — C4,6 | CONNECTION | | − |
| C1,5 — C5,6 | NON-CONNECTION | C2,4 | 1 |
| C2,3 — C2,4 | NON-CONNECTION | C5,6 | 1 |
| C2,3 — C3,4 | NON-CONNECTION | NON-PRESENCE | 0 |
| C2,3 — C3,5 | NON-CONNECTION | NON-PRESENCE | 0 |
| C2,3 — C4,6 | CONNECTION | | − |
| C2,3 — C5,6 | CONNECTION | | − |
| C2,4 — C3,4 | NON-CONNECTION | C1,5 | 1 |
| C2,4 — C3,5 | CONNECTION | | − |
| C2,4 — C4,6 | NON-CONNECTION | C1,5 | 1 |
| C2,4 — C5,6 | CONNECTION | | − |
| C3,4 — C3,5 | NON-CONNECTION | NON-PRESENCE | 0 |
| C3,4 — C4,6 | NON-CONNECTION | C1,5 | 1 |
| C3,4 — C5,6 | NON-CONNECTION | NON-PRESENCE | 0 |
| C3,5 — C4,6 | NON-CONNECTION | NON-PRESENCE | 0 |
| C3,5 — C5,6 | NON-CONNECTION | C2,4 | 1 |
| C4,6 — C5,6 | NON-CONNECTION | C1,2, C1,3, C2,3 | 3 |

FIG.16B

| COMBINATION OF COMMUNICATION LINKS | SCORE | PATTERN |
|---|---|---|
| C4,6 — C5,6 | 3 | C4,6=C5,6=1 |
| C1,2 — C1,3 | 2 | C1,2=C1,3=2 |
| C1,2 — C2,3 | 2 | C2,3=2 |
| C1,3 — C2,3 | 2 | Pattern 1 |
| C1,2 — C1,5 | 1 | C1,5=2 |
| C1,2 — C2,4 | 1 | Pattern 2 |
| C1,3 — C1,5 | 1 | Pattern 1 |
| C1,3 — C2,4 | 1 | Pattern 2 |
| C1,5 — C2,3 | 1 | Pattern 1 |
| C1,5 — C3,5 | 1 | C3,5=2 |
| C1,5 — C5,6 | 1 | Pattern 1 |
| C2,3 — C2,4 | 1 | Pattern 2 |
| C2,4 — C3,4 | 1 | C2,4=C3,4=3 |
| C2,4 — C4,6 | 1 | Pattern 1 |
| C3,4 — C4,6 | 1 | Pattern 1 |
| C3,4 — C5,6 | 1 | Pattern 1 |

RADIO FREQUENCY ASSIGNING APPARATUS, WIRELESS COMMUNICATION SYSTEM, AND RADIO FREQUENCY ASSIGNING METHOD

TECHNICAL FIELD

The present invention generally relates to a radio channel allocation apparatus, a radio communication system, and a radio channel allocation method, in which allocation of radio channels is controlled in a radio communication system which performs an autonomous distributed type asynchronous digital radio transmission using a virtual carrier sense.

BACKGROUND ART

In an asynchronous digital radio transmission system in which autonomous distributed control is assumed, radio signals must be transmitted or received between radio stations where the radio signals can reach each station so as to control allocation of radio channels (radio frequencies).

In a system using a virtual carrier sense, communications are established between radio stations which perform transmission and reception of signals with each other by exchanging "a transmission request signal" and "a preparation completion signal". Another radio station receiving the above signals postpones transmission of "a transmission request signal" based on "a transmission inhibition period" included in the received signal.

The virtual carrier sense has not been publicly known at the time of applying for a patent of the present invention as far as the applicant of the present invention knows.

In addition, the applicant could not find any technical report relating to the present invention. Therefore, technical documents relating to the present invention are not described herein.

However, existing technologies have the following problems.

Instead of direct communications between radio stations, when a multi-hop transmission is performed in which transmission communications between the radio stations are established by relay operations of another radio station located between the radio stations, transmission throughput is largely degraded.

FIG. 1 is a diagram showing a collision of transmission request signals in a multi-hop transmission. Referring to FIG. 1, a case is studied. In the case, when a radio station 13 and a radio station 14 establish communications by exchanging a transmission request signal and a preparation completion signal, a radio station 12 has transmission inhibition conditions. In this case, the transmission request signals from the radio station 13 to the radio stations 12 and 14 collide. As shown in FIG. 2, even if a radio station 11 transmits a transmission request signal to the radio station 12, since the radio station 12 is in the transmission inhibition conditions, the radio station 12 does not transmit a preparation completion signal. Consequently, the radio station 11 repeats transmitting the transmission request signal to the radio station 12. FIG. 2 is a diagram showing transmission inhibition conditions in the multi-hop transmission.

When the transmission inhibition conditions of the radio station 12 continue while the radio station 11 repeats transmitting the transmission request signal to the radio station 12, the radio station 11 discards data to be transmitted due to impossibility of communications. Consequently, the transmission throughput may be greatly degraded caused by discarding the data.

In addition, in a mesh network in compliance with IEEE 802.11, an exposed terminal problem may be generated due to a positional relationship among radio stations which desire to perform communications.

In this case, a packet is repeatedly transmitted based on operations stipulated in IEEE 802.11. However, even if repeated transmission of the packet is performed, when communications are not established, it is handled as packet loss. Consequently, communication quality is degraded. FIG. 3A is a diagram showing an exposed terminal problem. In FIG. 3A, a case is described in which communications between radio stations 11 and 12 and between radio stations 13 and 14 are performed using the same radio frequency (channel) $f_1$. In a case where a signal from a radio station reaches only a nearest radio station, for example, during communications between the radio stations 13 and 14, communication quality between the radio stations 11 and 12 is greatly degraded.

When plural usable radio frequencies (channels) exist, the above quality problem can be solved by using a different radio frequency for communications between radio stations from a radio channel for communications between other radio stations. FIG. 3B is a diagram showing a solution to the exposed terminal problem. For example, as shown in FIG. 3B, a radio frequency $f_2$ is used for communications between the radio stations 11 and 12, while the radio frequency $f_1$ is used for communications between the radio stations 13 and 14.

However, when radio frequencies to use are arbitrarily determined between radio stations in the network, the number of radio frequencies becomes large beyond necessity.

DISCLOSURE OF THE INVENTION

In a preferred embodiment of the present invention, there is provided a radio channel allocation apparatus, a radio communication system, and a radio channel allocation method, in which transmission throughput degradation in a multi-hop transmission can be prevented.

In addition, according to an embodiment of the present invention, there is provided a radio channel allocation apparatus, a radio communication system, and a radio channel allocation method, in which increase of the number of radio channels (frequencies) can be restrained while solving an exposed terminal problem.

In order to achieve one or more of these and other advantages, according to one aspect of the present invention, there is provided a radio channel allocation apparatus of a node in a radio communication system which controls to allocate a radio channel between nodes by a virtual carrier sense. The radio channel allocation apparatus includes a node information collecting unit which collects information of a neighboring node to which the node can directly transmit data, and a radio channel determining unit that determines a radio channel. The determined radio channel is allocated to a communication link between a node which has transmission inhibition conditions and another node which does not have the transmission inhibition conditions by communications between predetermined nodes. The determined radio channel is a different radio channel from a radio channel between the predetermined nodes, based on node information of the node and the neighboring node. Therefore, transmission throughput degradation can be prevented.

According to another aspect of the present invention, there is provided a radio communication system which controls to allocate a radio channel between nodes by a virtual carrier sense. The radio communication system includes a node information collecting unit which collects information of a neighboring node to which a node can directly transmit data, and a radio channel determining unit that determines a radio channel. The determined radio channel is allocated to a communication link between a node which has transmission inhibition conditions and another node which does not have the transmission inhibition conditions by communications between predetermined nodes. The determined radio channel is a different radio channel from a radio channel between the predetermined nodes, based on node information of the node and the neighboring node. Therefore, a multi-hop transmission can be performed by preventing transmission throughput degradation.

According to another aspect of the present invention, there is provided a radio channel allocation method in a radio communication system which controls to allocate a radio channel between nodes by a virtual carrier sense. The radio channel allocation method includes the steps of collecting information of a neighboring node to which a node can directly transmit data; receiving information of the neighboring node collected at the node at the neighboring node; and determining a radio channel, which is allocated to a communication link between a node which has transmission inhibition conditions and another node which does not have the transmission inhibition conditions by communications between predetermined nodes. The determined radio channel is a different radio channel from a radio channel between the predetermined nodes, based on the received node information. The method further includes the step of transmitting information of the determined radio channel. Therefore, the radio channels can be allocated while preventing transmission throughput degradation.

According to an embodiment of the present invention, a radio channel allocation apparatus, a radio communication system, and a radio channel allocation method can prevent transmission throughput degradation in a multi-hop transmission.

BRIEF DESCRIPTION OF THE DRAWINGS

Features and advantages of the present invention will become more apparent from the following detailed description when read in conjunction with the accompanying drawings, in which:

FIG. 1 is a diagram showing a collision of transmission request signals in a multi-hop transmission;

FIG. 2 is a diagram showing transmission inhibition conditions in the multi-hop transmission;

FIG. 4 is a diagram showing a radio communication system according to a first embodiment of the present invention

FIG. 8 is a flowchart showing operations of the radio communication system according to the first embodiment of the present invention;

FIG. 16A is a table showing radio channel settings according to the second embodiment of the present invention;

FIG. 16B is a table in which the table shown in FIG. 16A is modified;

DETAILED DESCRIPTION OF THE PREFERRED EMBODIMENTS

Figure 3A:
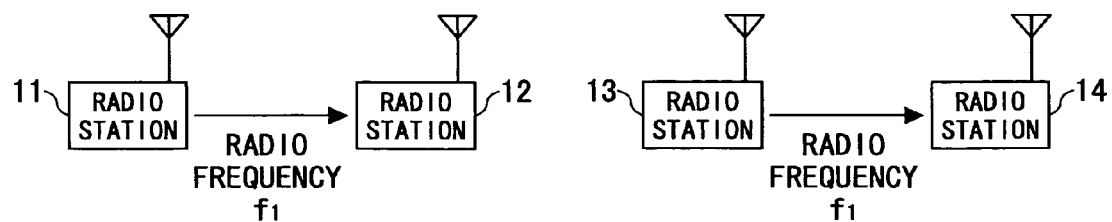
FIG. 3A is a diagram showing an exposed terminal problem.
Figure 3B:
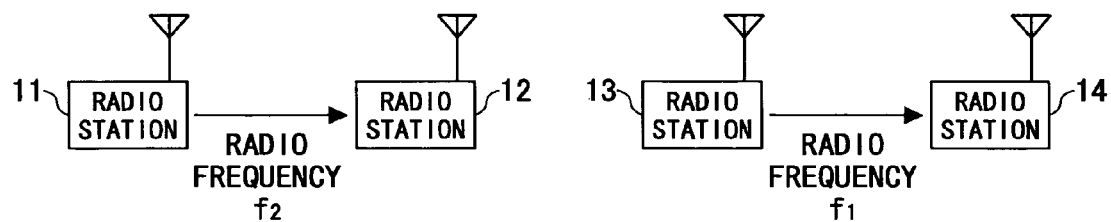
FIG. 3B is a diagram showing a solution to the exposed terminal problem.

In the following, embodiments of the present invention are described with reference to the drawings. In the drawings and description, some elements are the same, and each of the same elements has the same reference number. Therefore, the same description is omitted.

The transmission throughput degradation in the multi-hop transmission shown in FIGS. 1 and 2 is generated in the following situation. The radio station 11 intends to transmit data to the radio station 12 which can recognize a transmission situation between the radio stations 13 and 14 by using the same radio channel as that being used between the radio stations 13 and 14, while the radio station 11 cannot recognize the transmission situation between the radio stations 13 and 14.

When a radio channel different from a radio channel being used between the radio stations 13 and 14 is used for data transmission between the radio stations 11 and 12, the transmission throughput degradation problem can be solved.

When the radio channels are determined to solve the above problem, in a three-hop transmission, it is determined that a radio channel of a $1^{st}$ hop is different from that of a $3^{rd}$. However, in a four-hop or more transmission, an allocation method of radio channels (frequencies) is not fixed.

In order to determine a radio channel between radio stations, a list of radio stations is required in which list the radio stations that are connectable with each other are described. Hereinafter, the list is referred to as neighboring node information. The neighboring node information can be formed by the following method. For example, a packet called "Hello Packet" which is a packet exclusively for forming the neighboring node information is broadcast, and a packet responding to the "Hello Packet" is received. As another method, the neighboring node information can be formed by, for example, receiving data transmissions which are performed between other radio stations.

Figure 5:
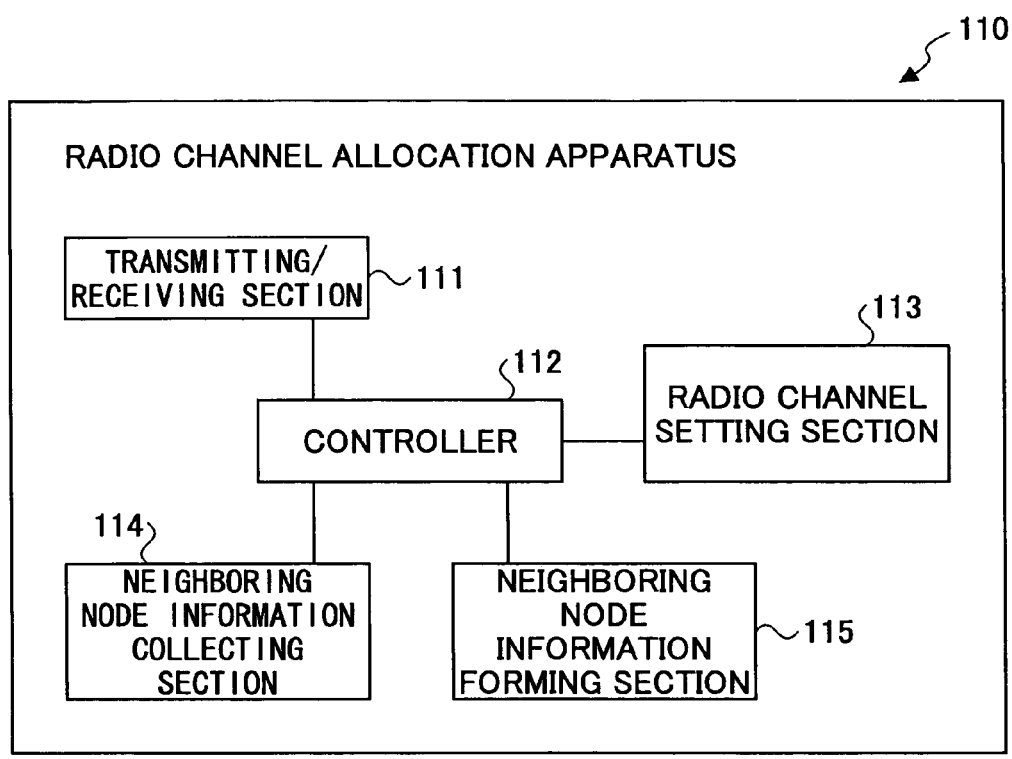
FIG. 5 is a diagram showing a radio station shown in FIG. 4.

Next, referring to FIGS. 4 and 5, a radio communication system according to a first embodiment of the present invention is described. FIG. 4 is a diagram showing the radio communication system according to the first embodiment of the present invention. FIG. 5 is a diagram showing a radio station shown in FIG. 4.

As shown in FIG. 4, the radio communication system according to the first embodiment of the present invention includes radio stations 110, 120, 130, and 140. The number of the radio stations in the radio communication system is not limited to four, and five or more radio stations can be included in the radio communication system.

As shown in FIG. 5, the radio station 110 includes a radio channel allocation apparatus. The radio channel allocation apparatus includes a transmitting/receiving section 111, a controller 112, a radio channel setting section 113, a neighboring node information collecting section 114, and a neighboring node information forming section 115. The transmitting/receiving section 111, the radio channel setting section 113, the neighboring node information collecting section 114, and the neighboring node information forming section 115 are connected to the controller 112. The controller 112 controls all the sections in the radio channel allocation apparatus. The radio stations 120, 130, and 140 have the same structure as that of the radio station 110; therefore, the same description is omitted.

In the radio station 110, the neighboring node information collecting section 114 collects information of neighboring nodes (radio stations) to which the radio station 110 can directly transmit data. For example, the neighboring node information collecting section 114 in the radio station 110 collects information of the radio stations 110 and 120. The information of the neighboring nodes includes information of its own radio station. The neighboring node information forming section 115 forms neighboring node information by using the information collected by the neighboring node information collecting section 114. For example, the neighboring node information forming section 115 forms the neighboring node information in which information of the radio stations 110 and 120 is included. The transmitting/receiving section 111 transmits the neighboring node information formed by the neighboring node information forming section 115 to the radio station 120.

In the radio station 120, when the transmitting/receiving section 111 receives the neighboring node information from the radio station 110, the neighboring node information collecting section 114 collects information of neighboring nodes of the radio station 120. For example, the neighboring node information collecting section 114 collects information of the radio stations 120, 110, and 130.

The neighboring node information forming section 115 of the radio station 120 forms neighboring node information by adding the neighboring node information received from the radio station 110 to the neighboring node information formed by the own radio station 120. For example, the neighboring node information forming section 115 forms the neighboring node information including the information of the radio stations 110 and 120 which are connectable from the radio station 110, and the information of the radio stations 120, 110, and 130 which 110 and 130 are connectable from the radio station 120. The transmitting/receiving section 111 of the radio station 120 transmits the neighboring node information formed by the neighboring node information forming section 115 to the radio station 130.

In the radio station 130, when the transmitting/receiving section 111 receives the neighboring node information from the radio station 120, similar to in the radio station 120, the neighboring node information collecting section 114 collects information of neighboring nodes of the radio station 130. For example, the neighboring node information collecting section 114 collects information of the radio stations 130, 120, and 140.

The neighboring node information forming section 115 of the radio station 130 forms neighboring node information by adding the neighboring node information received from the radio station 120 to the neighboring node information formed by the own radio station 130. For example, the neighboring node information forming section 115 forms neighboring node information including the information of the radio stations 110 and 120 of which 120 is connectable from the radio station 110, the information of the radio stations 120, 110, and 130 of which 110 and 130 are connectable from the radio station 120, and the information of the radio stations 130, 120, and 140 of which 120 and 140 are connectable form the radio station 130. The transmitting/receiving section 111 of the radio station 130 transmits the neighboring node information formed by the neighboring node information forming section 115 to the radio station 140.

Figure 6:
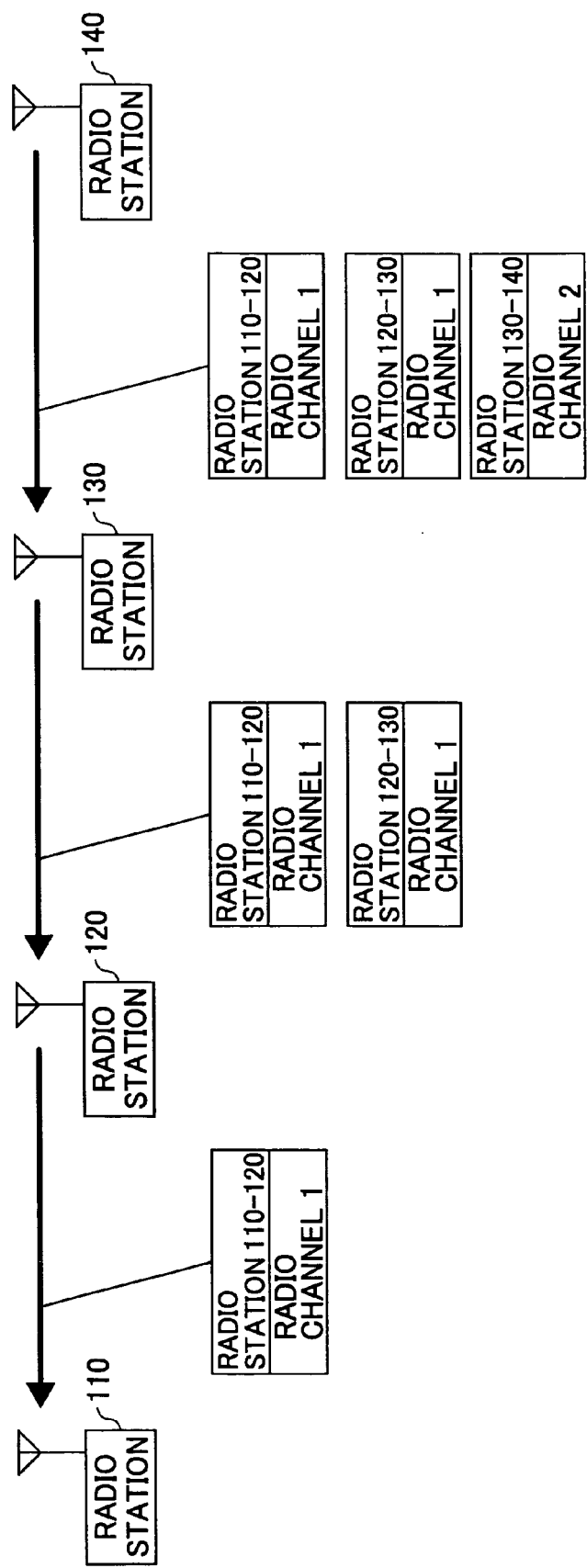
FIG. 6 is a diagram showing the radio communication system in which radio channels are determined according to the first embodiment of the present invention.

FIG. 6 is a diagram showing the radio communication system in which radio channels are determined according to the first embodiment of the present invention. In the radio station 140, when the transmitting/receiving section 111 receives the neighboring node information from the radio station 130, as shown in FIG. 6, the radio channel setting section 113 determines each radio channel which is used between the radio stations from the received neighboring node information. For example, it is determined that a radio channel 1 is between the radio stations 110 and 120, the radio channel 1 is between the radio stations 120 and 130, and a radio channel 2 is between the radio stations 130 and 140. The transmitting/receiving section 111 of the radio station 140 transmits the determined radio channels to the radio station 130 as radio channel setting information.

When the transmitting/receiving section 111 of the radio station 130 receives the radio channel setting information transmitted from the radio station 140, the radio channel setting section 113 deletes the radio channel setting information between the radio stations 130 and 140 from the received radio channel setting information. The transmitting/receiving section 111 of the radio station 130 transmits the radio channel setting information in which the radio channel setting information between the radio stations 130 and 140 is deleted to the radio station 120. That is, the transmitting/receiving section 111 of the radio station 130 transmits the radio channel setting information to the radio station 120 in which information the radio channel 1 is between the radio stations 110 and 120 and the radio channel 1 is between the radio stations 120 and 130.

When the transmitting/receiving section 111 of the radio station 120 receives the radio channel setting information transmitted from the radio station 130, similar to in the radio station 130, the radio channel setting section 113 deletes the radio channel setting information between the radio stations 120 and 130 from the received radio channel setting information. The transmitting/receiving section 111 of the radio station 120 transmits the radio channel setting information in which the radio channel setting information between the radio stations 120 and 130 is deleted to the radio station 110. That is, the transmitting/receiving section 111 of the radio station 120 transmits the radio channel setting information in which the radio channel 1 is between the radio stations 110 and 120 to the radio station 110.

In the radio station 110, when the transmitting/receiving section 111 receives the radio channel setting information from the radio station 120, the radio channel setting section 113 sets the radio channel corresponding to the received radio channel setting information. That is, the radio channel setting section 113 sets that the radio channel between the radio stations 110 and 120 is the radio channel 1.

In each of the radio stations 120 and 130, the radio channel setting section 113 sets the radio channel corresponding to the received radio channel setting information. That is, the radio channel setting section 113 of the radio station 120 sets that the radio channel between the radio stations 120 and 130 is the radio channel 1 and the radio channel setting section 113 of the radio station 130 sets that the radio channel between the radio stations 130 and 140 is the radio channel 2.

Figure 7A:
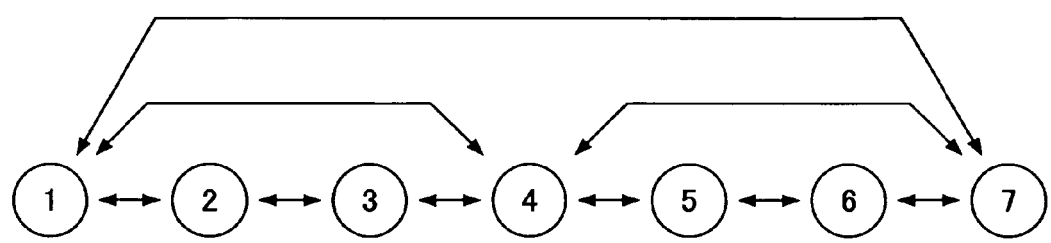
FIG. 7A is a diagram showing a radio communication system in which a six-hop transmission is performed in seven nodes.
Figure 7B:
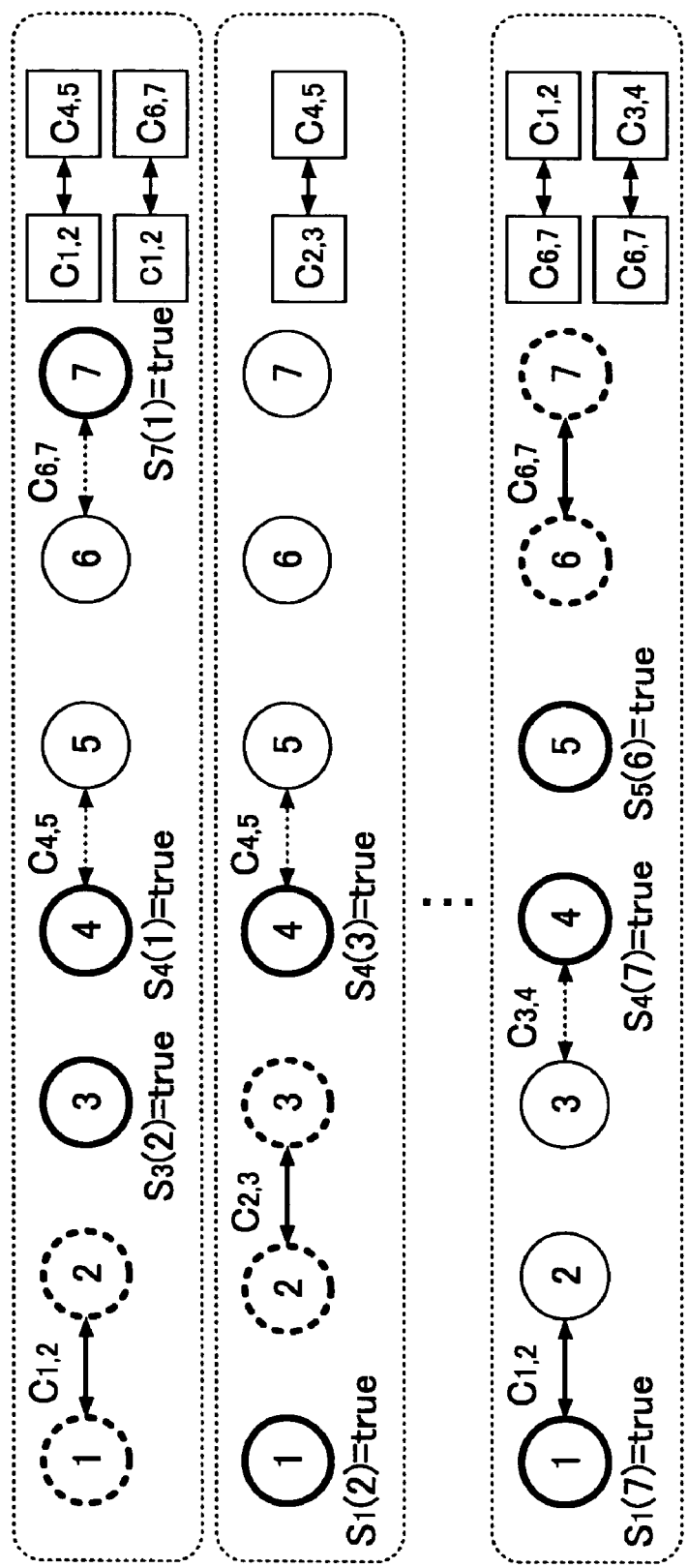
FIG. 7B is a diagram showing relationships among radio channels between nodes in the radio communication system in which the six-hop transmission is performed in the seven nodes.
Figure 7C:
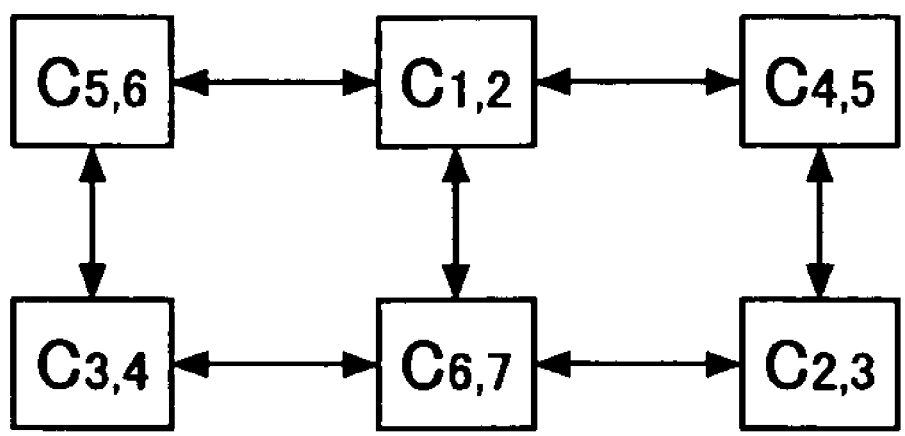
FIG. 7C is a diagram showing relationships among the radio channels between the nodes in the radio communication system in which the six-hop transmission is performed in the seven nodes.

Next, referring to FIG. 7A through 7C, determination of the radio channels being performed by the radio channel setting section 113 is described. FIG. 7A is a diagram showing a radio communication system in which a six-hop transmission is performed in seven nodes (radio stations). In FIG. 7A, a circled number shows a node and an arrow shows a communication link between the nodes.

In FIG. 7A, in addition to that radio waves are transmitted between neighboring two nodes, the radio waves are transmitted between the nodes 1 and 4, between the nodes 4 and 7, and between the bodes 1 and 7.

For example, when communications between the nodes 1 and 2 are performed, radio waves from the node 1 reach the nodes 2, 4, and 7.

When a destination radio station is determined to be, for example, the node 2, a connection (communication link) between the nodes 2 and another node on communication links is defined as a connection A, and one of the connections other than the connection A on the communication links is defined as a connection B. For example, the node 2 determines that a connection between the nodes 2 and 1 is the connection A and a connection between the nodes 4 and 5 is the connection B, which connection B is one of the connections other than the connection A.

In any one of the following cases, the destination station determines that the connection A uses a different radio channel from a radio channel which is used in the connection B. In a first case, radio waves from a transmission station or a reception station in the connection A reach a transmission station in the connection B, and the radio waves neither from the transmission station nor the reception station in the connection A reach a reception station in the connection B. In a second case, the radio waves from the transmission station or the reception station in the connection A reach the reception station in the connection B, and the radio waves neither from the transmission station nor the reception station in the connection A reach the transmission station in the connection B. In a third case, the radio waves from the transmission station or the reception station in the connection B reach the transmission station in the connection A, and the radio waves neither from the transmission station nor the reception station in the connection B reach the reception station in the connection A. In a fourth case, the radio waves from the transmission station or the reception station in the connection B reach the reception station in the connection A, and the radio waves neither from the transmission station nor the reception station in the connection B reach the transmission station in the connection A.

For example, as described above, the node 2 determines that the connection between the nodes 2 and 1 is the connection A on the communication links and the connection between the nodes 4 and 5 is the connection B on the communication links, which connection B is one of the connections other than the connection A. In this case, the node 2 determines whether the connections A and B accommodate any one of the following cases. In a first case, radio waves from the node 1 or 2 in the connection A reach the node 4 in the connection B, and the radio waves neither from the node 1 nor the node 2 in the connection A reach the node 5 in the connection B. In a second case, radio waves from the node 1 or 2 reach the node 5, and the radio waves neither from the node 1 nor the node 2 reach the node 4. In a third case, radio waves from the node 4 or 5 reach the node 1, and the radio waves neither from the node 4 nor the node 5 reach the node 2. In a fourth case, radio waves from the node 4 or 5 reach the node 2, and the radio waves neither from the node 4 nor the node 5 reach the node 1.

In this case, the first case is accommodated, that is, the radio waves from the node 1 or the node 2 reach the node 4, and the radio waves neither from the node 1 nor the node 2 reach the node 5. Therefore, it is determined that the radio channel between the nodes 1 and 2 in the connection A is different from the radio channel between the nodes 4 and 5 in the connection B.

In addition, when it is determined that the connection between the nodes 2 and 1 is the connection A and a connection, for example, between nodes 6 and 7 is the connection B which is one of the connections other than the connection A, this accommodates a case in which the radio waves from the node 1 or the node 2 reach the node 7, and the radio waves neither from the node 1 nor the node 2 reach the node 6. Therefore, it is determined that the radio channel between the nodes 1 and 2 is different from the radio channel between the nodes 6 and 7.

The above processes are applied to all the connections (communication links) between the nodes 2 and 3, between the nodes 3 and 4, between the nodes 5 and 6, and between the nodes 6 and 7.

FIG. 7B is a diagram showing relationships among radio channels between nodes in the radio communication system in which the six-hop transmission is performed in the seven nodes. In FIG. 7B, circled numbers are nodes and arrows are connections (communication links) between the nodes, and a radio channel between nodes "n" and "m" is $C_{m,n}$ (each of n and m is a different integer). In addition, in FIG. 7B, $S_j(k)$ is "true" when a carrier of the node "k" can be sensed at a node "l", that is, $S_l(k)$ is "true" when radio waves of the node "k" can reach the node "l". Further, in the right side of FIG. 7B, radio channels which must be different from each other are shown, for example, in the upper part of FIG. 7B, the radio channel $C_{1,2}$ is different from the radio channel $C_{4,5}$, and the radio channel $C_{1,2}$ is different from the radio channel $C_{6,7}$. This case is described in FIG. 7A.

When the above cases used in FIG. 7A are applied to FIG. 7B, as shown in the middle part of FIG. 7B, a radio channel between the nodes 2 and 3 must be different from a radio channel between the nodes 4 and 5. In addition, as shown in the lower part of FIG. 7B, a radio channel between the nodes 6 and 7 must be different from a radio channel between the nodes 1 and 2 and a radio channel between the nodes 3 and 4.

FIG. 7C is a diagram showing relationships among radio channels between nodes in a radio communication system in which a six-hop transmission is performed in seven nodes. In FIG. 7C, the determined results of FIGS. 7A and 7B are described. In addition, in FIG. 7C, a radio channel between nodes "n" and "m" is $C_{m,n}$ (each of n and m is a different integer), an arrow shows a relationship between the radio channels, and the relationship signifies that the radio channels must be different from each other.

In FIG. 7C, for example, a connection between the nodes 5 and 6 must be a different radio channel from a connection between the nodes 1 and 2 and a connection between the nodes 3 and 4. In this case, the radio channels $C_{1,2}$, $C_{3,4}$, and $C_{2,3}$ can use the same radio channel, and the radio channels $C_{5,6}$, $C_{6,7}$, and $C_{4,5}$ can use the same radio channel. That is, the number of necessary radio channels is two.

As described above, when a first radio channel is used between first and second radio stations and the first radio channel generates transmission inhibition conditions in a third radio station which uses the first radio channel between the third radio station and a fourth radio station, the first radio channel between the third and fourth radio stations is determined to be a different radio channel from the first radio channel based on the neighboring node information. With this, the transmission throughput degradation can be prevented and the number of radio channels to be allocated can be small.

FIG. 8 is a flowchart showing operations of the radio communication system according to the first embodiment of the present invention. Referring to FIG. 8, the operations of the radio communication system according to the first embodiment of the present invention are described.

First, the radio station 110 collects information of neighboring nodes of the radio station 110, forms neighboring node information by using the collected information (step S702), and transmits the formed neighboring node information to the radio station 120 (step S704).

The radio station 120 receives the neighboring node information from the radio station 110, collects information of neighboring nodes of the radio station 120 (step S706), forms neighboring node information by adding the collected information to the neighboring node information received from the radio station 110 (step S708), and transmits the formed neighboring node information to the radio station 130 (step S710).

The radio station 130 receives the neighboring node information from the radio station 120, collects information of neighboring nodes of the radio station 130 (step S712), forms neighboring node information by adding the collected information to the neighboring node information received from the radio station 120 (step S714), and transmits the formed neighboring node information to the radio station 140 (step S716).

The radio station 140 receives the neighboring node information from the radio station 130, and determines radio channels between corresponding radio stations based on the received neighboring node information of all the radio stations on communication links by referring to the processes shown in FIGS. 7A through 7C (step S718). Then, the radio station 140 transmits the determined radio channels to the radio station 130 as radio channel setting information (step S720).

The radio station 130 receives the radio channel setting information from the radio station 140, sets a radio channel between the radio stations 130 and 140 (S722), and deletes the radio channel setting information between the radio stations 130 and 140 from the received radio channel setting information (step S724). Then, the radio station 130 transmits the radio channel setting information in which the radio channel setting information between the radio stations 130 and 140 is deleted to the radio station 120 (step S726).

Similarly, the radio station 120 receives the radio channel setting information from the radio station 130, sets a radio channel between the radio stations 120 and 130 (S728), and deletes the radio channel setting information between the radio stations 120 and 130 from the received radio channel setting information (step S730). Then, the radio station 120 transmits the radio channel setting information in which the radio channel setting information between the radio stations 120 and 130 is deleted to the radio station 110 (step S732).

The radio station 110 receives the radio channel setting information from the radio station 120, and sets a radio channel between the radio stations 110 and 120 based on the received radio channel setting information (step S736).

In the present embodiment, in some radio stations, a radio station collects the neighboring node information of its own radio station after receiving the neighboring node information from a preceding radio station. However, the radio station can collect the neighboring node information of its own radio station beforehand. In this case, the time needed to set the radio channel can be shortened.

In a radio communication system in which a radio channel is shared among communication links by using autonomous distributed control, frequency utilizing efficiency in which the same radio channel is used between neighboring radio stations is not decreased. However, when the same radio channel is used among the communication links located at a distance, the frequency utilizing efficiency may be largely decreased. As described above, in a radio channel allocation method according to the present embodiment, it is basically different from a concept that communications among neighboring radio stations are performed by simply using different radio channels.

In FIG. 8, the radio communication system which performs a three-hop transmission by using four radio stations is described. When the present embodiment is applied to a radio communication system using five or more radio stations, the transmission throughput degradation in a multi-hop transmission can be prevented.

Figure 9A:
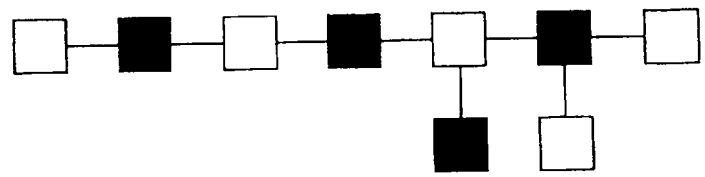
FIG. 9A is a diagram showing first allocation of radio channels in a nine-hop transmission of a radio communication system.
Figure 9B:
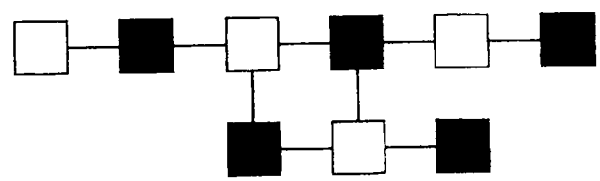
FIG. 9B is a diagram showing second allocation of radio channels in a nine-hop transmission of a radio communication system.
Figure 9C:
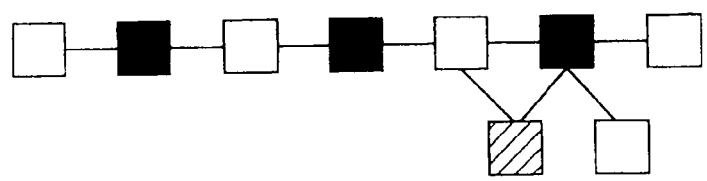
FIG. 9C is a diagram showing third allocation of radio channels in a nine-hop transmission of a radio communication system.

FIGS. 9A through 9C are diagrams showing radio channel settings in a radio communication system of a nine-hop transmission according to the first embodiment of the present invention. Referring to FIGS. 9A through 9C, as an example, combinations of different radio channel settings in the nine-hop transmission are described. In each of FIGS. 9A, 9B, and 9C, a different combination of radio channel settings is shown, and a square shows a radio channel in a communication link between nodes. In FIGS. 9A through 9C, a different radio channel (frequency) must be allocated in each of the radio channels connected by a line, and each radio channel has a pattern, where the same radio channel has the same pattern. In FIGS. 9A and 9B, the necessary number of radio channels is two, and in FIG. 9C, the necessary number of radio channels is three, by the patterns. In the above structure, the number of radio channels to be allocated can be small.

The first embodiment of the present invention is not limited to the above specific embodiment and can be applied to any communication links between nodes (radio stations).

Next, a radio communication system according to a second embodiment of the present invention is described.

In the radio communication system according to the second embodiment of the present invention, the above radio channel allocation method is applied to a mesh network, and can be applied to both an autonomous distributed control system and a centralized control system.

First, a diagram is described in which diagram communication links are connected and therebetween an exposed terminal problem may be generated. Hereinafter, the diagram is referred to as a chromatic graph.

Figure 10:
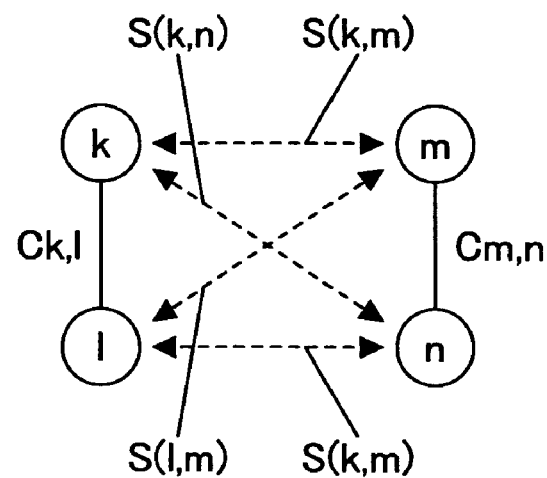
FIG. 10 is a diagram showing radio channel settings according to a second embodiment of the present invention.

FIG. 10 is a diagram showing radio channel settings according to the second embodiment of the present invention. Referring to FIG. 10, a criterion for whether an exposed terminal problem is generated among the following communication links is described. That is, in predetermined nodes k, l, m, and n, a communication link $C_{k,l}$ between the nodes k and l and a communication link $C_{m,n}$ between the nodes m and n exist, and the criterion for whether the exposed terminal problem is generated between the communication link $C_{k,l}$ and the communication link $C_{m,n}$ is described.

In two-way communications of TCP, when it is to be determined whether a combination of communication links relates to an exposed terminal problem, the criterion is whether a carrier can be sensed between the nodes k and l, and whether a carrier can be sensed between the nodes m and n. When conditions $S(k,m)$ are defined in which conditions a carrier from the node m to the node k can be sensed at the node k, the criterion (conditional expression) is:

if $[\{S(k,m) \text{ or } S(k,n)\} \neq \{S(l,m) \text{ or } S(l,n)\}]$ or $[\{S(k,m) \text{ or } S(l,m)\} \neq \{S(k,n) \text{ or } S(l,n)\}]$=TRUE or FALSE. When the criterion is TRUE, an exposed terminal problem is generated.

For example, (1) when carriers from the nodes m and n cannot be sensed at the node k and a carrier from the node m or n can be sensed at the node l, the nodes m and n cannot know about a transmission inhibition period corresponding to transmission of a signal from the node k to the node l. Therefore, an exposed terminal problem is generated when a signal is transmitted from the node m or n to the node l.

In addition, (2) when carriers from the nodes k and l cannot be sensed at the node m and a carrier from the node k or l can be sensed at the node n, the nodes k and l cannot know about a transmission inhibition period corresponding to transmission of a signal from the node m to the node n. Therefore, an exposed terminal problem is generated when a signal is transmitted from the node k or l to the node n.

Therefore, when the conditional expression is TRUE (the exposed terminal problem may be generated) in the above communications (1) or (2), the relationship between the communication links $C_{k,l}$ and $C_{m,n}$ is determined to be a connection relationship in which an exposed terminal problem is generated between the communication links, by using the chromatic graph.

On the other hand, when both the transmission radio station and the reception radio station can know about the transmission inhibition period or both the radio stations cannot know about the transmission inhibition period by communications therebetween (that is, when both the radio stations cannot communicate with each other) (the conditional expression is FALSE), the relationship between the communication links $C_{k,l}$ and $C_{m,n}$ is determined to be a connection relationship in which an exposed terminal problem is not generated between the communication links, by using the chromatic graph. When the above determination is applied to communications between all the communication links, all connection relationships between the communication links can be expressed on the chromatic graph. The present embodiment is not limited to TCP and can be applied to other protocols. In addition, the present embodiment is not limited to two-way communications and can be applied to one-way communications.

Figure 11A:
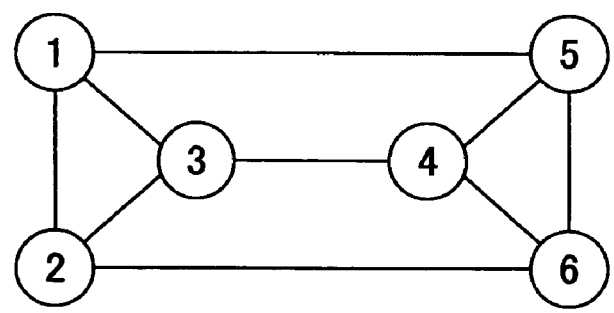
FIG. 11A is a diagram showing communication links in a mesh network of six nodes.
Figure 11B:
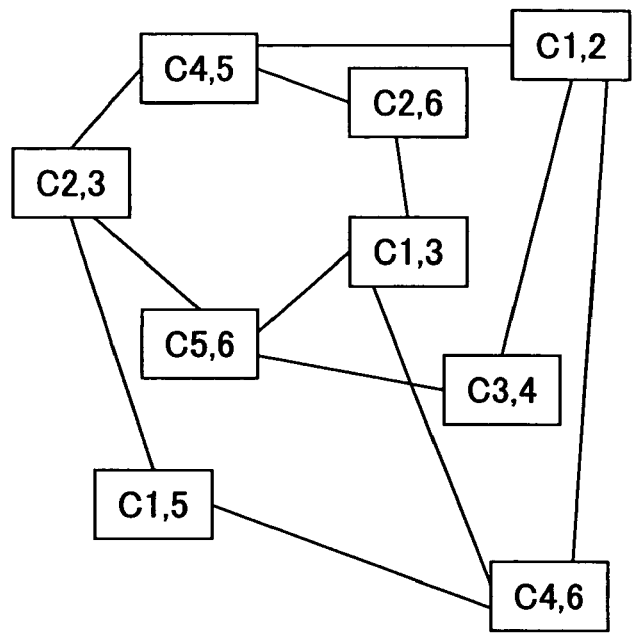
FIG. 11B is a diagram showing a chromatic graph obtained from the communication links shown in FIG. 11A.

Next, referring to FIGS. 11A and 11B, a chromatic graph in a mesh network is described.

FIG. 11A is a diagram showing communication links in a mesh network of six nodes. FIG. 11B is a diagram showing a chromatic graph obtained from the communication links shown in FIG. 11A.

In FIG. 11A, communications links exist between nodes 1 and 2, between the node 1 and a node 3, between the nodes 2 and 3, between the node 1 and a node 5, between the node 2 and a node 6, between the node 3 and a node 4, between the nodes 4 and 5, between the nodes 4 and 6, and between the nodes 5 and 6.

Data transmission can be performed on all the communication links. That is, a carrier sense can be performed on all the communication links.

In this case, the chromatic graph is formed as shown in FIG. 11B, and radio channel allocation to avoid an exposed terminal problem can be performed by utilizing the chromatic graph.

In FIG. 11B, combinations of the communication links in which an exposed terminal problem may be generated are as follows. The combination of communication links $C_{2,3}$ and $C_{4,5}$, the combination of communication links $C_{2,3}$ and $C_{5,6}$, the combination of communication links $C_{2,3}$ and $C_{1,5}$, the combination of communication links $C_{4,5}$ and $C_{1,2}$, the combination of communication links $C_{4,5}$ and $C_{2,6}$, the combination of communication links $C_{5,6}$ and $C_{1,3}$, the combination of communication links $C_{5,6}$ and $C_{3,4}$, the combination of communication links $C_{1,3}$ and $C_{2,6}$, the combination of communication links $C_{1,3}$ and $C_{4,6}$, the combination of communication links $C_{1,5}$ and $C_{4,6}$, the combination of communication links $C_{4,6}$ and $C_{1,2}$, and the combination of communication links $C_{3,4}$ and $C_{1,2}$.

In the mesh network, the number of the communication links is exponentially increased corresponding to an increase of the number of nodes. In addition, the chromatic graph becomes complex and the number of the radio channels to be required to avoid the exposed terminal problem is larger than that in a multi-hop transmission.

In an actual mesh network, a data transmission using communication links in which a path loss is relatively large is effectively prohibited so as not to degrade the throughput and so as to increase the total amount to be processed.

Figure 12A:
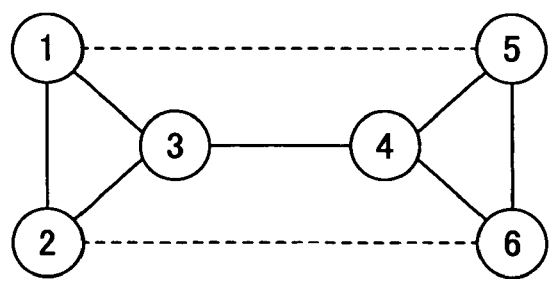
FIG. 12A is a diagram showing modified communication links shown in FIG. 11A.
Figure 12B:
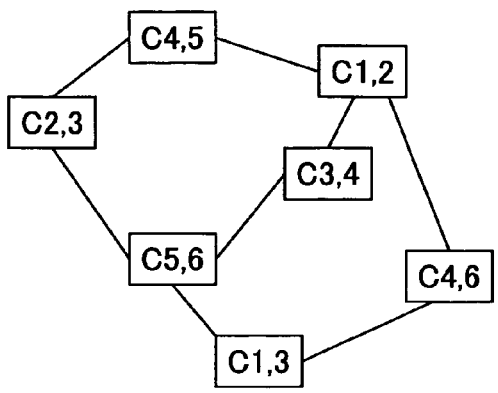
FIG. 12B is a diagram showing a chromatic graph obtained from the modified communication links shown in FIG. 12A.

FIG. 12A is a diagram showing modified communication links shown in FIG. 11A. FIG. 12B is a diagram showing a chromatic graph obtained from the modified communication links shown in FIG. 12A. For example, as shown in FIG. 12A, when data transmission using the communication links between the nodes 1 and 5 and between the nodes 2 and 6 shown in FIG. 11A is prohibited (those links are shown by dashed lines in FIG. 12A), since these communication links are deleted from the chromatic graph, the chromatic graph can be simplified as shown in FIG. 12B. The dashed lines become carrier sensing lines in FIG. 12A.

Figure 13:
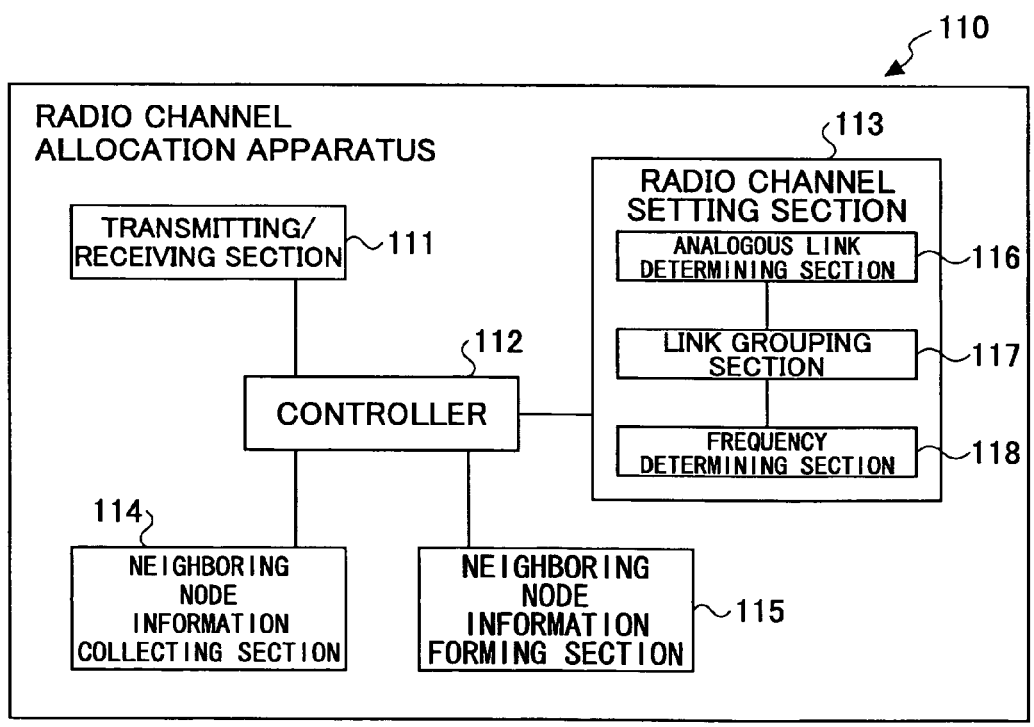
FIG. 13 is a diagram showing the radio station according to the second embodiment of the present invention.

Next, referring to FIG. 13, a radio station according to the second embodiment of the present invention is described. FIG. 13 is a diagram showing the radio station according to the second embodiment of the present invention. In FIG. 13, a radio station 110 has the same reference number as that in the first embodiment; however the structure is different from that in the first embodiment.

The radio station 110 according to the present embodiment includes a radio channel allocation apparatus. The radio channel allocation apparatus includes a transmitting/receiving section 111, a controller 112, a radio channel setting section 113, a neighboring node information collecting section 114, and a neighboring node information forming section 115. The transmitting/receiving section 111, the radio channel setting section 113, the neighboring node information collecting section 114, and the neighboring node information forming section 115 are connected to the controller 112. The controller 112 controls all sections in the radio channel allocation apparatus. The radio channel setting section 113 includes an analogous link determining section 116, a link grouping section 117, and a frequency setting section 118. The structure of the radio channel setting section 113 is different from that in the first embodiment. Each of other radio stations in the mesh network has the same structure as that of the radio station 110.

First, in order to form neighboring node information, the neighboring node information forming section 115 broadcasts a packet via the controller 112 and the transmitting/receiving section 111, in which packet information of its own radio station such as an ID of the own radio station, a using frequency in the own radio station, and neighboring node information of the own radio station are included.

In a radio station received the packet, the neighboring node information collecting section 114 collects information of the neighboring nodes. In addition, the neighboring node information forming section 115 forms neighboring node information by adding neighboring node information of its own radio station to the received neighboring node information and broadcasts a packet in which information of its own radio station and the formed neighboring node information are included. When the above processes are repeated, the neighboring node information collecting section 114 of each radio station can collect information of neighboring nodes.

Further, the neighboring node information forming section 115 in each radio station forms a chromatic graph based on the formed neighboring node information and estimates combinations of communication links in which an exposed terminal problem may be generated. Specifically, combinations of communication links in which an exposed terminal problem may be generated are estimated based on the following basis. That is, in a case where both a transmission station and a reception station on a communication link (communication link A) which is recognized by the neighboring node information are out of a communication range with another radio station (radio station B) which is recognized by the neighboring node information, an exposed terminal problem is generated in communications between its own radio station and the radio station B during communications on the communication link A.

In order to efficiently perform a frequency change to solve the exposed terminal problem, the following operations are performed.

The neighboring node information forming section 115 in each radio station estimates a combination of communication links in which an exposed terminal problem may be generated based on the formed neighboring node information and broadcasts a packet including the estimated result.

Each radio station recognizes all combinations of communication links, in which the exposed terminal problem may be generated, surrounding its own radio station by referring to the combinations of the communication links in which the exposed terminal problem may be generated included in the broadcast packet.

The analogous link determining section 116 in each radio station recognizes the combinations of the communication links, in which the exposed terminal problem may be generated, surrounding its own radio station and searches combinations of communication links having a common point (common communication link) with which communication link an exposed terminal problem may be generated, and determines the combinations of the communication links in which the exposed terminal problem may be generated. That is, the analogous link determining section 116 searches for a combination of communication links having a common point in which an exposed terminal problem may be generated from the combinations of the communication links. The link grouping section 117 forms a group of communication links, and grouping of the communication links is described below in detail.

Figure 14A:
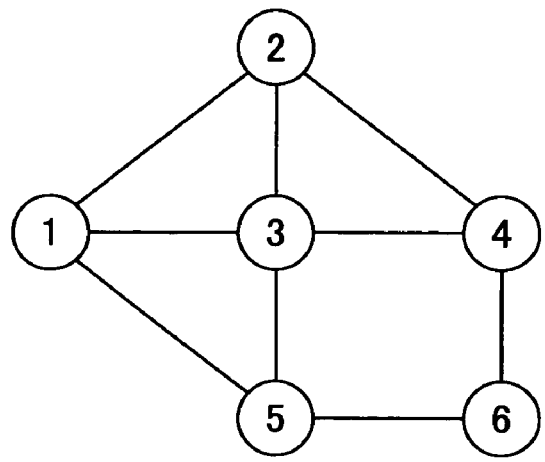
FIG. 14A is a diagram showing communication links in a mesh network in which six radio stations (nodes) are included.
Figure 14B:
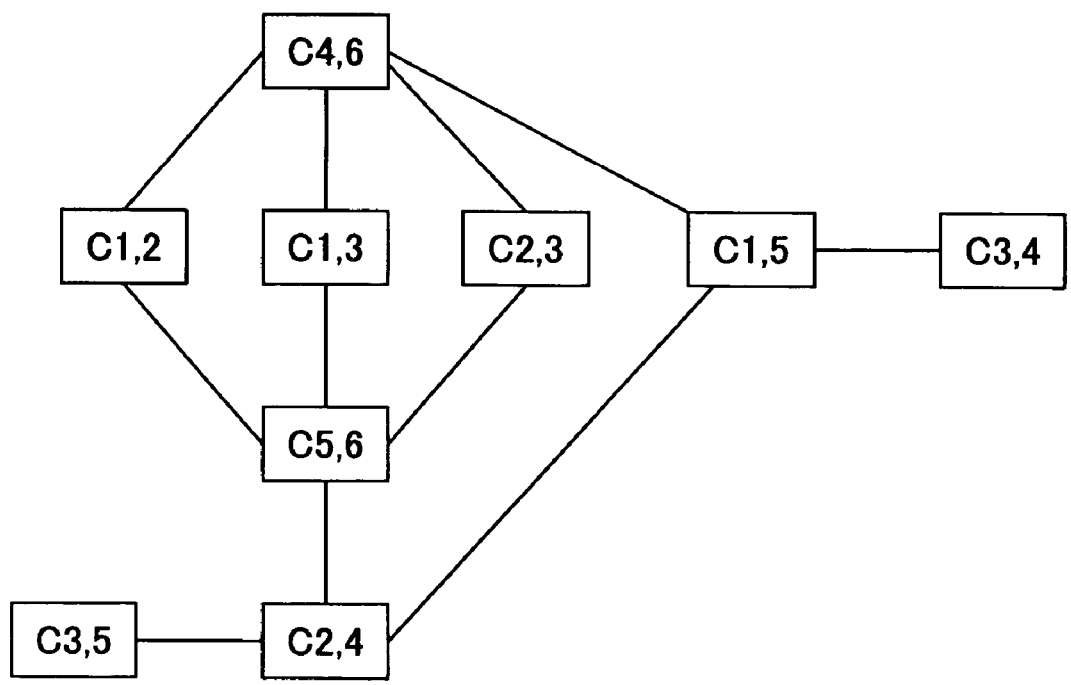
FIG. 14B is a diagram showing a chromatic graph obtained from the communication links shown in FIG. 14A.

For example, referring to FIGS. 14A and 14B, the above is described in detail. FIG. 14A is a diagram showing communication links in a mesh network in which six radio stations (nodes) are included. In FIG. 14A, a circled number shows a node and a continuous line shows a communication link between nodes. FIG. 14B is a diagram showing a chromatic graph obtained from the communication links shown in FIG. 14A. In FIG. 14B, a rectangle shows a communication link and a continuous line shows a combination of the communication links in which an exposed terminal problem may be generated.

In FIG. 14A, communications links exist between nodes 1 and 2, between the node 1 and a node 3, between the node 1 and a node 5, between the nodes 2 and 3, between the node 2 and a node 4, between the nodes 3 and 4, between the nodes 3 and 5, between the node 4 and a node 6, and between the nodes 5 and 6.

Each node forms neighboring node information. Then, each node estimates a combination of communication links in which an exposed terminal problem may be generated based on the above conditions of the combination of the communication links in which the exposed terminal problem may be generated. The conditions are used to allocate different frequencies to corresponding communication links to be connected. Based on the estimation, the chromatic graph shown in FIG. 14B is formed.

In FIG. 14B, restriction on a frequency allocating to communication links exists in a combination of the communication links C4,6 and C1,2, a combination of the communication links C4,6 and C1,3, a combination of the communication links C4,6 and C2,3, a combination of the communication links C4,6 and C1,5, a combination of the communication links C5,6 and C1,2, a combination of the communication links C5,6 and C1,3, a combination of the communication links C5,6 and C2,3, a combination of the communication links C5,6 and C2,4, a combination of the communication links C1,5 and C2,4, a combination of the communication links C1,5 and C3,4, and a combination of the communication links C2,4 and C3,5.

In a radio communication network in which radio stations (nodes) connect with each other, when radio waves reach the radio stations, the radio stations can perform communications by using a communication route different from a direct communication route. For example, communications between the nodes 2 and 4 can be performed via the node 3 instead of using the direct communication route. In this case, the chromatic graph can be simplified by assuming that the communications are performed by not using the direct communication route.

Figure 15A:
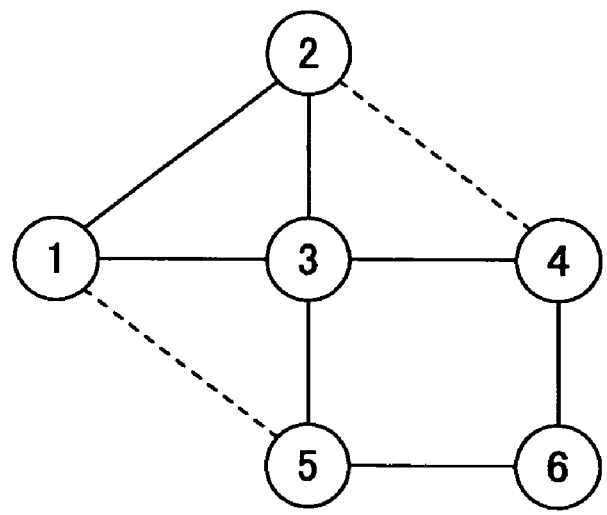
FIG. 15A is a modified diagram of FIG. 14A in which some communication links are assumed not to perform communications.
Figure 15B:
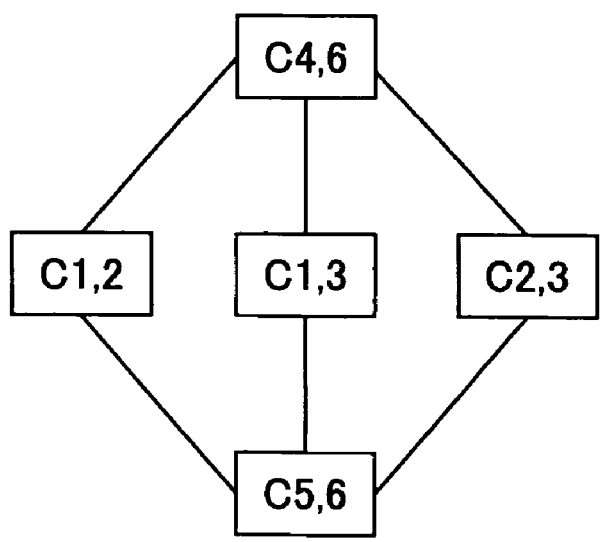
FIG. 15B is a diagram showing a chromatic graph obtained from the communication links shown in FIG. 15A.

FIG. 15A is a modified diagram of FIG. 14A in which some communication links are assumed not to perform communications. In FIG. 15A, for example, the communication links between the nodes 2 and 4 and between the nodes 1 and 5 are assumed not to perform communications and those communication links are shown by corresponding dashed lines. FIG. 15B is a diagram showing a chromatic graph obtained from the communication links shown in FIG. 15A. As shown in FIG. 15B, the chromatic graph can be simplified. As described above, when some communication links are assumed not to perform communications, the number of radio frequencies (radio channels) can be decreased, processes to determine the radio channels can be also decreased, and the processing speed can be fast.

The chromatic graph of the radio stations may become a part of the chromatic graph shown in FIG. 14B due to the size of the radio communication network or the transfer of the neighboring node information. However, in the following, a case is described in which case all the radio stations share all information on the chromatic graph. Even in a case where each radio station shares a part of the information on the chromatic graph, the following processes are not changed.

The analogous link determining section 116 searches for the number of communication links which are common in each combination of the communication links shown in a chromatic graph. However, when combinations of communication links are connected with each other, the number is not searched for. FIG. 16A is a table showing radio channel settings according to the second embodiment of the present invention. The table shown in FIG. 16A is based on the chromatic graph shown in FIG. 14B. In FIG. 16A, the score shows the number of the combinations of the communication links which are common in each combination of the communication links, and "-" in the score shows that a combination of communication links is directly connected. In the search of the number, a common communication link is specified and it is confirmed whether a combination of communication links is connected. That is, FIG. 16A is an analogous list of combinations of communication links.

In the calculation of the score, the following method can be used. The analogous link determining section 116 calculates the score in the following operations when a predetermined communication link is defined as AA and communication links other than AA are defined as BB. That is, when both the AA and BB generate an exposed terminal problem in another communication link, a predetermined value is added to evaluation variables of AA and BB; when a communication link which generates an exposed terminal problem with AA does not generate the exposed terminal problem with BB, a predetermined value is subtracted from the evaluation variable of AA; and when a communication link which generates an exposed terminal problem with BB does not generate the exposed terminal problem with AA, a predetermined value is subtracted from the evaluation variable of BB.

The analogous link determining section 116 determines a common communication link in which an exposed terminal problem is generated based on the calculated score. In the present embodiment, the subtraction is not performed and when both the AA and BB generate an exposed terminal problem with another communication link, 1 is added to evaluation variables of AA and BB; with this the score is calculated. In this case, the score becomes the number of the common communication links.

Next, the analogous link determining section 116 removes the combinations of the communication links in which the score cannot be calculated or is "0" and rearranges the table in a predetermined order. For example, the table is rearranged in order of high score and removes the connection relationship. With this, a table shown in FIG. 16B is obtained. FIG. 16B is the table in which the table shown in FIG. 16A is modified. In FIG. 16B, two cases are shown in PATTERN. That is, a case in which a radio channel can be allocated and another case in which a radio channel cannot be allocated. In the case that a radio channel can be allocated, allocation contents are shown, and in the case where a radio channel cannot be allocated, two conditions "Pattern 1" and "Pattern 2" (described below) are shown. PATTERN in FIG. 16B is described below in detail. In FIG. 16B, a numeral in PATTERN shows a group and is described below in detail.

The link grouping section 117 forms a group of communication links based on the table shown in FIG. 16B, for example, forms the group in order of high score. For example, the link grouping section 117 forms a first group from the communication links C4,6 and C5,6 in which the score is three. Next, regarding the communication links C1,2 and C1,3 in which the score is two, since a communication link belonging to the first group exists in a communication link connected to the C1,2 or C1,3, the C1,2 and C1,3 are formed as a second group.

Next, regarding the communication links C1,2 and C2,3, the C1,2 belongs to the second group and the C2,3 is not connected to the other communication link C1,3 in the second group; therefore, the C2,3 is determined to be set in the second group. Next, regarding the communication links C1,3 and C2,3, since both the C1,3 and C2,3 are in the second group, a new group is not formed.

Figure 17:
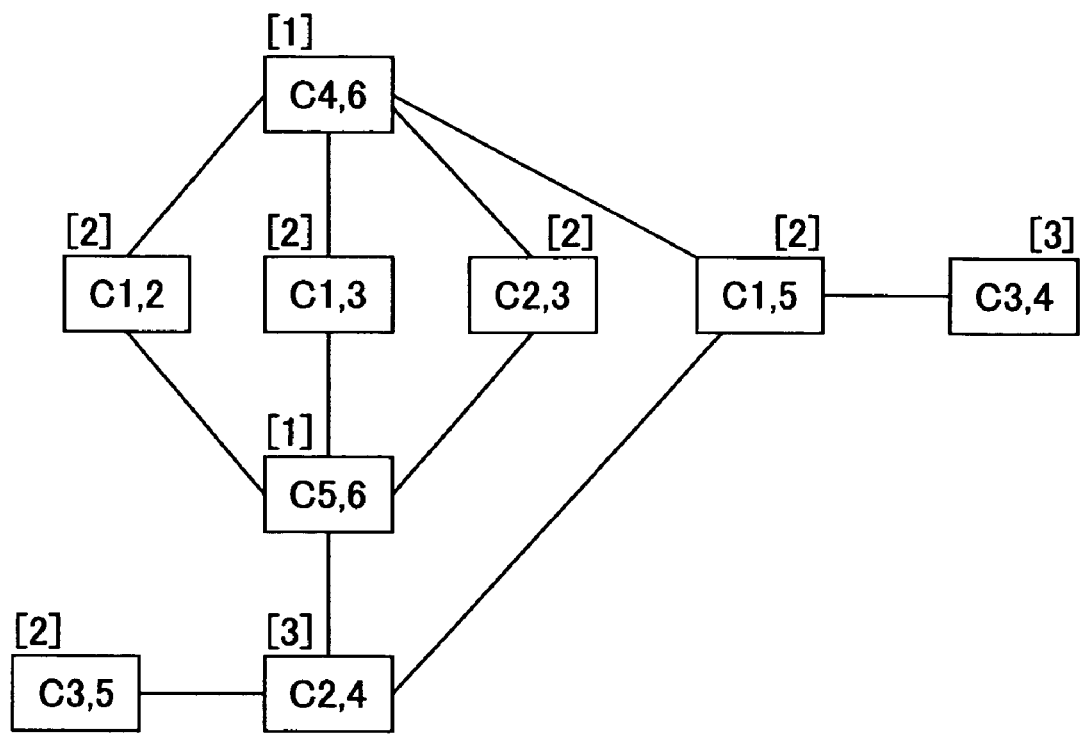
FIG. 17 is a diagram showing a chromatic graph with groups of the communication links in which the table shown in FIG. 16B is used.

Next, regarding the communication links C1,2 and C1,5, similar to the case of the C1,2 and C2,3, the C1,5 is determined to be set in the second group. Next, regarding the combination of communication links C1,2 and C2,4, the C1,2 belongs to the second group but the C2,4 is connected to the other communication link C1,5 in the second group; therefore, the C2,4 is determined not to be set in any group. Similarly, when the above is applied to all the communication links, grouping of the communication links is completed. In the present embodiment, as shown in FIG. 17, the communication links form three groups. FIG. 17 is a diagram showing a chromatic graph with groups of the communication links in which the table shown in FIG. 16B is used. A numeral in a bracket [ ] shows the group in FIG. 17. Consequently, in order to solve the exposed terminal problem, radio channel allocation can be performed by using three radio channels (frequencies).

Next, the frequency determining section 118 determines and allocates a radio channel to each communication link so that the same radio channel is allocated to the communication links in the same group.

In FIG. 15B, the simplified chromatic graph is described in which graph the communication links C1,5 and C2,4 are not used. However, the chromatic graph can be simplified by another method. Specifically, when the combination of the communication links C1,5 and C4,6, the combination of the communication links C1,5 and C5,6, the combination of the communication links C2,4 and C4,6, and the combination of the communication links C2,4 and C5,6 are deleted from the table shown in FIG. 16A, the chromatic graph can be simplified (actually, the combination of the communication links C1,5 and C4,6 and the combination of the communication links C2,4 and C5,6 are deleted).

Figure 18:
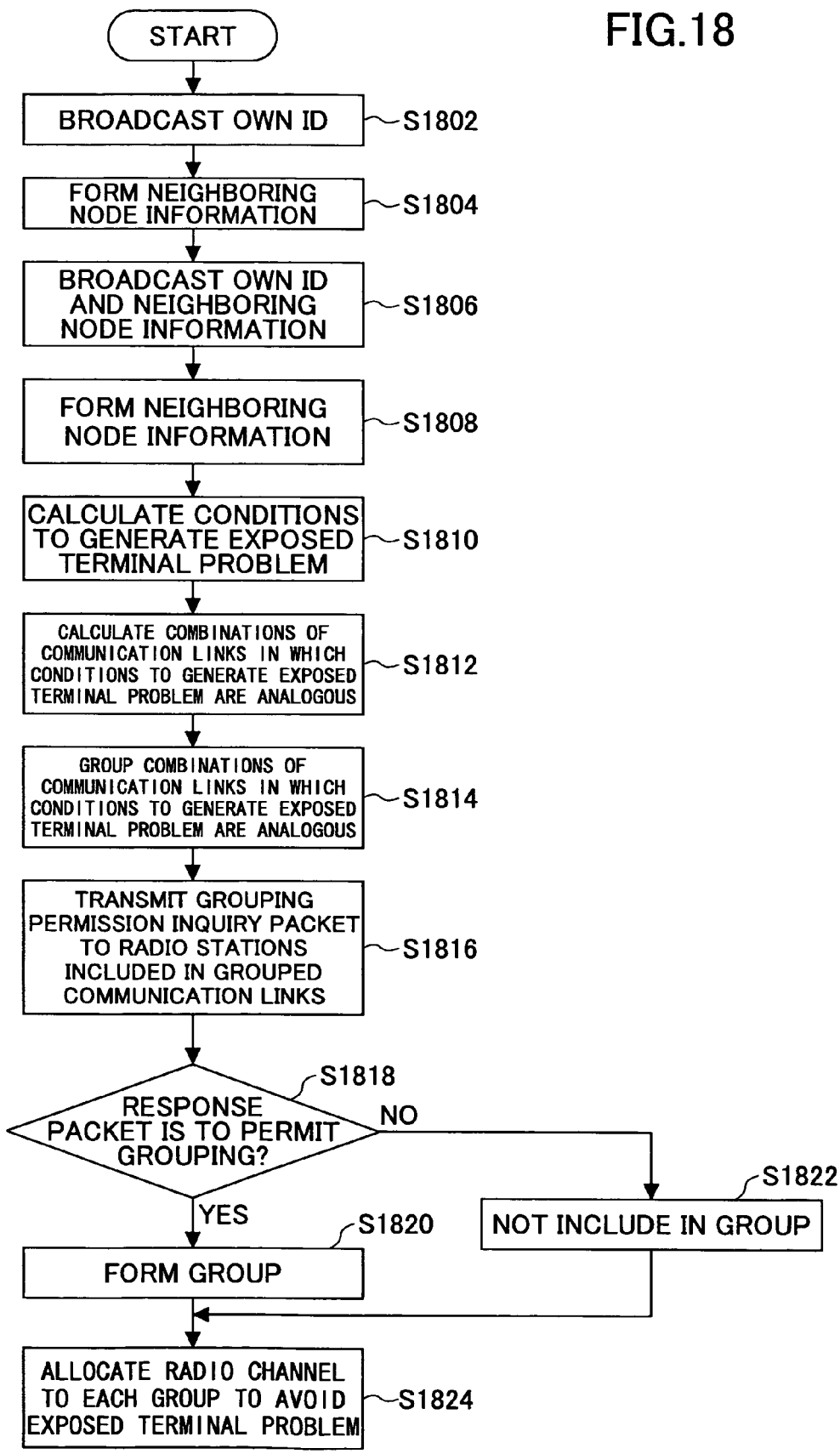
FIG. 18 is a flowchart showing operations of allocating a radio channel to each group of the communication links according to the second embodiment of the present invention.
Figure 19:
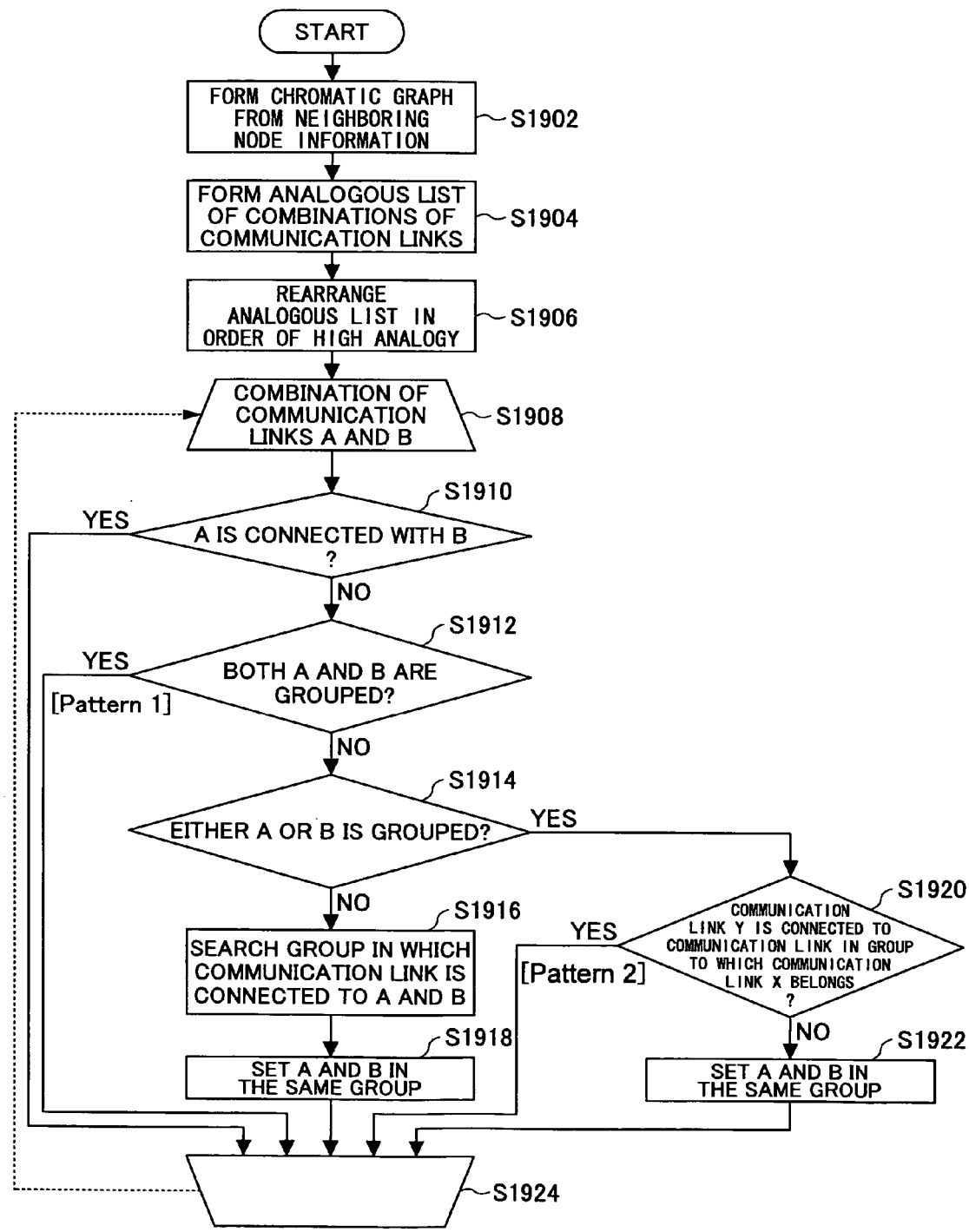
FIG. 19 is a flowchart showing operations of grouping the communication links according to the second embodiment of the present invention.

Next, referring to FIGS. 18 and 19, operations of radio stations according to the second embodiment of the present invention are described. First, operations of allocating a radio channel to each group of the communication links according to the present embodiment are described. FIG. 18 is a flowchart showing the operations of allocating a radio channel to each group of the communication links according to the present embodiment.

First, a first radio station broadcasts an ID of its own radio station (step S1802). A second radio station receives the ID of the first radio station, forms neighboring node information (step S1804), and broadcasts an ID of its own radio station and the formed neighboring node information to a third radio station (step S1806). The third radio station receives the ID and the neighboring node information from the second radio station, and forms neighboring node information (step S1808).

Next, conditions which generate an exposed terminal problem are calculated, that is, a chromatic graph is formed (step S1810). Next, combinations of communication links in which the conditions generating the exposed terminal problem are analogous are calculated (step S1812). Next, the combinations of the communication links are grouped in which combinations the conditions generating the exposed terminal problem are analogous (step S1814). Then, a grouping permission inquiry packet is transmitted to radio stations included in the grouped communication links (step S1816).

When each radio station receives response packets for the grouping permission inquiry packet from other radio stations, the radio station determines whether each of the response packets is to permit the grouping (step S1818). When each of the response packets is to permit the grouping (YES in step S1818), the radio station forms a group of the communication links. When some response packets are not to permit the grouping (NO in step S1818), the radio station does not include the communication links responding no permission in the group of the communication links (step S1822).

Next, the radio station allocates a radio channel to each of the groups to avoid the exposed terminal problem (step S1824).

Next, referring to FIG. 19, operations of grouping the communication links according to the second embodiment of the present invention are described. FIG. 19 is a flowchart showing the operations of grouping the communication links according to the second embodiment of the present invention.

First, a chromatic graph is formed by neighboring node information (step S1902). Next, an analogous list of combinations of communication links is formed (step S1904). The analogous list is shown in the table of FIG. 16A. Then, the analogous list is rearranged in order of high analogy (step S1906). The rearranged analogy list is shown in the table of FIG. 16B.

Next, the following processes are repeated for all the combinations of the communication links (step S1908 through step S1924). First, the processes shown in step S1908 through step S1924 are performed for a combination of a communication link A and a communication link B as an example. First, it is determined whether the communication link A is connected with the communication link B (step S1910). When the communication link A is connected with the communication link B (YES in S1910), the process returns to step S1908 via step S1924. When the communication link A is not connected with the communication link B (NO in S1910), it is determined whether both the communication links A and B are grouped (step S1912).

When both the communication links A and B are grouped (YES in step S1912) (this state is called Pattern 1), the process returns to step S1908 via step S1924. When both the communication link A and the communication link B are not grouped (NO in step S1912), it is determined whether either the communication link A or the communication link B is grouped (step S1914).

When either the communication link A or the communication link B is not grouped (NO in step S1914), a group in which a communication link is set is searched for to which communication link the communication link A and the communication link B are connected (step S1916), and the communication link A and the communication link B are set in the same group (step S1918). Next, the process returns to step S1908 via step S1924, and the same processes are applied to other communication links other than the communication links A and B.

When either the communication link A or the communication link B is grouped with a communication link (YES in step S1914), in this case, it is defined that a communication link X is grouped with the communication link A or B and a communication link Y is not grouped with the communication link A or B, and it is determined whether the communication link Y is connected to a communication link in a group to which the communication link X belongs (step S1920).

When the communication link Y is connected to a communication link belonging to a group to which the communication link X belongs (YES in step S1920), (Pattern 2), the process returns to step S1908 via step S1924, and processes are applied to another combination of communication links.

When the communication link Y is not connected to a communication link belonging to a group to which the communication link X belongs (NO in step S1920), the communication link Y is set in the same group as the communication link X (step S1922). Then, the process returns to step S1908 via step S1924, and processes are applied to another combination of communication links.

In steps S1914 and S1920, it is defined that the communication link X is grouped with the communication link A or B and the communication link Y is not grouped with the communication link A or B; however, the following steps can be used. That is, it is determined whether the communication link A is grouped with a communication link, and it is determined whether the communication link B is grouped with a communication link belonging to a group of the communication link A.

Figure 20:
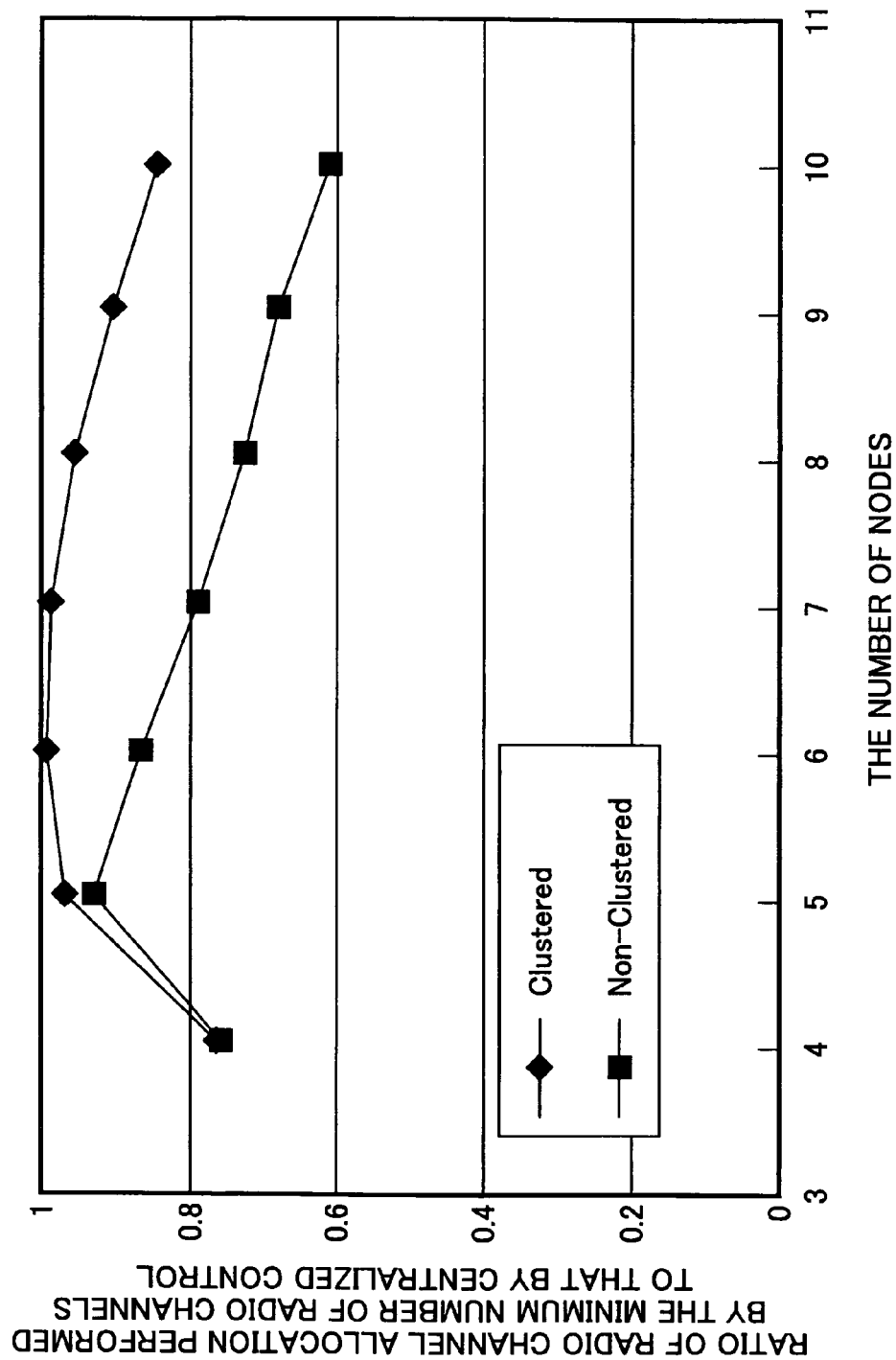
FIG. 20 is a graph showing an effect according to the second embodiment of the present invention.

FIG. 20 is a graph showing an effect according to the second embodiment of the present invention. Referring to FIG. 20, the effect is described when radio channels (frequencies) are allocated to corresponding grouped communication links. In FIG. 20, in the horizontal axis, it shows the number of nodes in a mesh network, and in the vertical axis, it shows the ratio of radio channel allocation performed by the minimum number of radio channels to that performed by centralized control.

In FIG. 20, "Non-Clustered" is a characteristic in which radio channels are allocated to corresponding communication links without grouping. That is, a radio channel is allocated to a communication link without grouping analogous communication links, and a changing process of a radio channel allocated to a terminal (node) relating to an exposed terminal problem is randomly performed by each node. Consequently, since the radio channels are not allocated by obtaining the total structure of the mesh network, when the number of nodes is increased, the number of radio channels is increased. For example, in a case where the number of nodes is 10, in approximately 60% allocation, the number of radio channels is the same as that in centralized control; however, in approximately remaining 40% allocation, the number of radio channels is increased when the number of radio channels is compared with that in the centralized control.

In FIG. 20, "Clustered" is a characteristic in which radio channels are allocated to corresponding communication links according to the second embodiment of the present invention. When the characteristic is compared with that shown in "Non-Clustered", the increase of the number of radio channels is restrained. For example, in a case where the number of nodes is 10, in approximately 80% allocation, the number of radio channels is the same as that in centralized control.

As shown in FIG. 20, the number of radio channels to be allocated can be decreased by using the radio channel allocation method according to the second embodiment of the present invention.

In the second embodiment of the present invention, each radio station broadcasts a packet including its own node ID and information of a combination of communication links in which an exposed terminal problem is generated; however the radio station can unicasts the packet. When the radio station unicasts the packet, the number of data flowing into the network can be decreased and the network can be effectively utilized.

The present invention is not limited to the specifically disclosed embodiments, and variations and modifications may be made without departing from the scope of the present invention.

The present invention is based on Japanese Priority Patent Application No. 2004-171821 filed on Jun. 9, 2004, and Japanese Priority Patent Application No. 2004-238574 filed on Aug. 18, 2004, the entire contents of which are hereby incorporated herein by reference.

INDUSTRIAL APPLICABILITY

The radio channel allocation apparatus, the radio communication system, and the radio channel allocation method according to the present invention can be applied to an autonomous distributed type asynchronous digital radio transmission system in which a virtual carrier sense is performed.

The invention claimed is:

1. A radio channel allocation apparatus of a node in a radio communication system which controls to allocate a radio channel between nodes by a virtual carrier sense, comprising:

a node information collecting unit which collects information of a neighboring node to which the node can directly transmit data;

a radio channel determining unit that determines a radio channel, which determined radio channel is allocated to a communication link between a node which has transmission inhibition conditions and another node which does not have the transmission inhibition conditions by communications between predetermined nodes, the determined radio channel being a different radio channel from a radio channel between the predetermined nodes, based on node information of the node and the neighboring node; and an analogous link determining unit to determine whether a common communication link exists in a combination of communication links based on predetermined criterion, wherein the radio channel determining unit determines a radio channel to be allocated to the determined communication link, and the analogous link determining unit determines whether a combination of communication links exists that generates an exposed terminal problem, and in a case where nodes k, l, m, and n exist in the radio communication system, the analogous link determining unit determines a combination of communication links, between the nodes k and l, and a communication link between the nodes m and n, as the combination of communication links that generates the exposed terminal problem, in one of the following cases, where the node k cannot sense carriers from the nodes m and n, but the node l can sense a carrier from the node m or n, and where the node m cannot sense carriers from the nodes k and l, but the node n can sense a carrier from the node k or l.

2. The radio channel allocation apparatus as claimed in claim 1, wherein:

in a case where it is defined that a predetermined communication link between nodes is A, and a communication link between nodes other than the predetermined communication link is B, in communication links of data transmission lines, the radio channel determining unit allocates a different radio channel to the communication link A from a radio channel allocated to the communication link B in any one of the following cases, where one of radio waves from a transmission node and a reception node in the communication link A reaches a transmission node in the communication link B, and the one of radio waves from the transmission node and the reception node in the communication link A does not reach the reception node in the communication link B, where one of the radio waves from the transmission node and the reception node in the communication link A reaches the reception node in the communication link B, and the one of radio waves from the transmission node and the reception node in the communication link A does not reach the transmission node in the communication link B, where one of radio waves from the transmission node and the reception node in the communication link B reaches the transmission node in the communication link A, and the one of radio waves from the transmission node and the reception node in the communication link B does not reach the reception node in the communication link A, and where one of the radio waves from the transmission node and the reception node in the communication link B reaches the reception node in the communication link A, and the one of radio waves from the transmission node and the reception node in the communication link B does not reach the transmission node in the communication link A.

3. The radio channel allocation apparatus as claimed in claim 1, wherein:

in a case where it is defined that a predetermined communication link is AA and a communication link other than the predetermined link is BB, the analogous link determining unit determines whether a combination of communication links exists, between the nodes, that generates the exposed terminal problem based on evaluation variables, of the AA and the BB, that are calculated by the following method, when both the AA and the BB generate the exposed terminal problem in another communication link, a predetermined value is added to the evaluation variables of the AA and the BB, when a communication link generating the exposed terminal problem with the AA does not generate the exposed terminal problem with the BB, a predetermined value is subtracted from the evaluation variable of the AA, and when a communication link generating the exposed terminal problem with the BB does not generate the exposed terminal problem with the AA, a predetermined value is subtracted from the evaluation variable of the BB.

4. The radio channel allocation apparatus as claimed in claim 1, further comprising:

a communication link grouping unit to group communication links having a common communication link based on the determined result by the analogous link determining unit, wherein the radio channel determining unit allocates the same radio channel to grouped communication links.

5. A radio communication system which controls to allocate a radio channel between nodes by a virtual carrier sense, comprising:

a node information collecting unit to collect information of a neighboring node to which a node can directly transmit data;

a radio channel determining unit to determine a radio channel, which determined radio channel is allocated to a communication link between a node which has transmission inhibition conditions and another node which does not have the transmission inhibition conditions by communications between predetermined nodes, the determined radio channel being a different radio channel from a radio channel between the predetermined nodes, based on node information of the node and the neighboring node; and an analogous link determining unit to determine whether a common communication link exists in a combination of communication links based on predetermined criterion, wherein the radio channel determining unit determines a radio channel to be allocated to the determined communication link, and the analogous link determining unit determines whether a combination of communication links exists that generates an exposed terminal problem, and in a case where nodes k, l, m, and n exist in the radio communication system, the analogous link determining unit determines a combination of a communication links, between the nodes k and l, and a communication link between the nodes m and n, as the combination of communication links that generates the exposed terminal problem, in one of the following cases, where the node k cannot sense carriers from the nodes m and n, but the node l can sense a carrier from the node m or n, and where the node m cannot sense carriers from the nodes k and l, but the node n can sense a carrier from the node k or l.

6. A radio channel allocation method in a radio communication system which controls to allocate a radio channel between nodes by a virtual carrier sense, comprising the steps of:

collecting information of a neighboring node to which a node can directly transmit data;

receiving information of the neighboring node collected at the node at the neighboring node;

determining a radio channel, which determined radio channel is allocated to a communication link between a node which has transmission inhibition conditions and another node which does not have the transmission inhibition conditions by communications between predetermined nodes, the determined radio channel being a different radio channel from a radio channel between the predetermined nodes, based on the received node information;

transmitting information of the determined radio channel; and determining whether a common communication link exists in a combination of communication links based on predetermined criterion, wherein determining a radio channel to be allocated to the determined communication link, determining whether a combination of communication links exists that generates an exposed terminal problem, and in a case where nodes k, l, m, and n exist in the radio communication system, determining a combination of a communication links between the nodes k and l, and a communication link between the nodes m and n, as the combination of communication links that generates the exposed terminal problem, in one of the following cases, where the node k cannot sense carriers from the nodes m and n, but the node l can sense a carrier from the node m or n, and where the node m cannot sense carriers from the nodes k and l, but the node n can sense a carrier from the node k or l.

* * * * *